United States Patent
Pundir et al.

(10) Patent No.: US 9,830,103 B2
(45) Date of Patent: Nov. 28, 2017

(54) TECHNIQUE FOR RECOVERY OF TRAPPED STORAGE SPACE IN AN EXTENT STORE

(71) Applicant: NetApp, Inc., Sunnyvale, CA (US)

(72) Inventors: Anshul Pundir, Sunnyvale, CA (US); Ling Zheng, Saratoga, CA (US); David Brittain Bolen, Durham, NC (US)

(73) Assignee: NetApp, Inc., Sunnyvale, CA (US)

( * ) Notice: Subject to any disclaimer, the term of this patent is extended or adjusted under 35 U.S.C. 154(b) by 0 days.

(21) Appl. No.: 14/988,435

(22) Filed: Jan. 5, 2016

(65) Prior Publication Data

US 2017/0192710 A1 Jul. 6, 2017

(51) Int. Cl.
G06F 3/06 (2006.01)

(52) U.S. Cl.
CPC ........... *G06F 3/0644* (2013.01); *G06F 3/067* (2013.01); *G06F 3/0608* (2013.01)

(58) Field of Classification Search
CPC .................................................. G06F 3/0641
See application file for complete search history.

(56) References Cited

U.S. PATENT DOCUMENTS

| | | | |
|---|---|---|---|
| 5,511,190 A | 4/1996 | Sharma et al. | |
| 5,860,082 A * | 1/1999 | Smith .................. | G06F 3/0608 711/103 |
| 5,937,425 A | 8/1999 | Ban | |
| 6,363,385 B1 * | 3/2002 | Kedem ................. | G06F 3/0607 |
| 6,397,307 B2 * | 5/2002 | Ohran ................. | G06F 11/1464 380/280 |
| 7,249,150 B1 | 7/2007 | Watanabe et al. | |
| 7,325,059 B2 | 1/2008 | Barach et al. | |
| 7,644,087 B2 | 1/2010 | Barkai et al. | |
| 7,680,837 B2 | 3/2010 | Yamato | |
| 7,996,636 B1 | 8/2011 | Prakash et al. | |
| 8,082,390 B1 | 12/2011 | Fan et al. | |
| 8,099,396 B1 | 1/2012 | Novick et al. | |

(Continued)

OTHER PUBLICATIONS

Cornwell, Michael, "Anatomy of a Solid-state Drive," ACM Queue—Networks, vol. 10, No. 10, Oct. 2012, pp. 1-7.
"Cuckoo hashing," Wikipedia, http://en.wikipedia.org/wiki/Cuckoo_hash, Apr. 2013, pp. 1-5.
Culik, K., et al., "Dense Multiway Trees," ACM Transactions on Database Systems, vol. 6, Issue 3, Sep. 1981, pp. 486-512.

(Continued)

*Primary Examiner* — Nathan Sadler
(74) *Attorney, Agent, or Firm* — Cesari and McKenna, LLP

(57) ABSTRACT

A technique enables recovery of storage space trapped in an extent store from overlapping write requests associated with metadata describing volume logical storage addresses for data in the extent store. The metadata is organized as metadata entries in a multi-level dense tree metadata structure. When a level of the dense tree is full, the metadata entries of the level are merged with a next lower level of the dense tree in accordance with a dense tree merge operation. The technique may be invoked during the merge operation to process the metadata entries associated with the overlapping write requests involved in the merge operation. Processing of the overlapping write requests during the merge operation may partially overwrite extents which, in turn, may result in logical storage space being trapped in the extent store. The technique may perform read-modify-write (RMW) operations on the partially overwritten extents to recapture that trapped space.

20 Claims, 15 Drawing Sheets

(56) References Cited

U.S. PATENT DOCUMENTS

| | | | |
|---|---|---|---|
| 8,205,065 B2 | 6/2012 | Matze | |
| 8,261,085 B1 | 9/2012 | Fernandez Gutierrez | |
| 8,341,457 B2 | 12/2012 | Spry et al. | |
| 8,417,987 B1 | 4/2013 | Goel et al. | |
| 8,495,417 B2 | 7/2013 | Jernigan, IV et al. | |
| 8,539,008 B2 | 9/2013 | Faith et al. | |
| 8,560,879 B1 | 10/2013 | Goel | |
| 8,595,595 B1 | 11/2013 | Grcanac et al. | |
| 8,745,338 B1* | 6/2014 | Yadav | G06F 3/0689 707/693 |
| 8,812,450 B1* | 8/2014 | Kesavan | G06F 3/0689 707/656 |
| 8,843,711 B1* | 9/2014 | Yadav | G06F 3/0608 711/154 |
| 8,892,818 B1* | 11/2014 | Zheng | G06F 17/30327 711/114 |
| 8,904,137 B1* | 12/2014 | Zhang | G06F 17/30135 711/165 |
| 8,996,797 B1* | 3/2015 | Zheng | G06F 17/30327 711/103 |
| 2003/0120869 A1 | 6/2003 | Lee et al. | |
| 2005/0144514 A1 | 6/2005 | Ulrich et al. | |
| 2007/0143359 A1 | 6/2007 | Uppala | |
| 2008/0126695 A1 | 5/2008 | Berg | |
| 2010/0042790 A1 | 2/2010 | Mondal et al. | |
| 2010/0088296 A1 | 4/2010 | Periyagaram et al. | |
| 2011/0035548 A1 | 2/2011 | Kimmel et al. | |
| 2011/0153972 A1* | 6/2011 | LaBerge | G06F 3/061 711/165 |
| 2011/0213928 A1 | 9/2011 | Grube et al. | |
| 2012/0278382 A1* | 11/2012 | Faith | G06F 3/064 709/203 |
| 2012/0290788 A1 | 11/2012 | Klemm et al. | |
| 2013/0018854 A1 | 1/2013 | Condict | |
| 2013/0138862 A1 | 5/2013 | Motwani et al. | |
| 2013/0238832 A1 | 9/2013 | Dronamraju et al. | |
| 2013/0238932 A1 | 9/2013 | Resch | |
| 2013/0268497 A1 | 10/2013 | Baldwin et al. | |
| 2013/0346810 A1 | 12/2013 | Kimmel et al. | |
| 2015/0121021 A1* | 4/2015 | Nakamura | G06F 3/0611 711/159 |
| 2016/0070480 A1 | 3/2016 | Babu et al. | |
| 2016/0077744 A1 | 3/2016 | Pundir et al. | |
| 2016/0139838 A1 | 5/2016 | D'Sa et al. | |
| 2017/0046257 A1* | 2/2017 | Babu | G06F 12/0253 |

OTHER PUBLICATIONS

Debnath, Biplob, et al., "FlashStore:.High Throughput Persistent Key-Value Store," Proceedings of the VLDB Endowment VLDB Endowment, vol. 3, Issue 1-2, Sep. 2010, pp. 1414-1425.

Gal, Eran et al., "Algorithms and Data Structures for Flash Memories," ACM Computing Surveys, vol. 37, No. 2, Jun. 2005, pp. 138-163.

Gray, Jim et al., "Flash Disk Opportunity for Server Applications," Queue—Enterprise Flash Storage, vol. 6, Issue 4, Jul.-Aug. 2008, pp. 18-23.

Handy, Jim, "SSSI Tech Notes: How Controllers Maximize SSD Life," SNIA, Jan. 2013, pp. 1-20.

Leventhal, Adam H., "A File System All Its Own," Communications of the ACM Queue, vol. 56, No. 5, May 2013, pp. 64-67.

Lim, H. et al., "SILT: A Memory-Efficient, High-Performance Key-Value Store," Proceedings of the $23^{rd}$ ACM Symposium on Operating Systems Principles (SOSP'11), Oct. 23-26, 2011, pp. 1-13.

Moshayedi, Mark, et al., "Enterprise SSDs," ACM Queue—Enterprise Flash Storage, vol. 6 No. 4, Jul.-Aug. 2008, pp. 32-39.

Pagh, Rasmus, et al., "Cuckoo Hashing," Elsevier Science, Dec. 8, 2003, pp. 1-27.

Pagh, Rasmus, "Cuckoo Hashing for Undergraduates," IT University of Copenhagen, Mar. 27, 2006, pp. 1-6.

Rosenblum, Mendel, et al., "The Design and Implementation of a Log-Structured File System," Proceedings of the $13^{th}$ ACM Symposium on Operating Systems Principles, Jul. 24, 1991, pp. 1-15.

Rosenblum, Mendel, et al., "The LFS Storage Manager," Summer '90 USENIX Technical Conference, Anaheim, California, Jun. 1990, pp. 1-16.

Rosenblum, Mendel, "The Design and Implementation of a Log-structured File System," UC Berkeley, Thesis, 1992, pp. 1-101.

Seltzer, Margo, et al., "An Implementation of a Log Structured File System for UNIX," Winter USENIX, San Diego, CA, Jan. 25-29, 1993, pp. 1-18.

Seltzer, Margo, et al., "File System Performance and Transaction Support," UC Berkeley, Thesis, 1992, pp. 1-131.

Smith, Kent, "Garbage Collection," SandForce, Flash Memory Summit, Santa Clara, CA, Aug. 2011, pp. 1-9.

Twigg, Andy, et al., "Stratified B-trees and Versioned Dictionaries," Proceedings of the 3rd USENIX Conference on Hot Topics in Storage and File Systems, vol. 11, 2011, pp. 1-5.

Wu, Po-Liang, et al., "A File-System-Aware FTL Design for Flash-Memory Storage Systems," Design, Automation & Test in Europe Conference & Exhibition, IEEE, 2009, pp. 1-6.

* cited by examiner

FIG. 6
(PRIOR ART)

DATA ENTRY (D) 610: TYPE 612 | OFFSET 614 | LENGTH 616 | EXTENT KEY 618

INDEX ENTRY (I) 620: TYPE 622 | OFFSET 624 | LENGTH 626 | PAGE KEY 628

HOLE ENTRY (HD) 630: TYPE 632 | OFFSET 634 | LENGTH 636

TECHNIQUE FOR RECOVERY OF TRAPPED STORAGE SPACE IN AN EXTENT STORE

BACKGROUND

Technical Field

The present disclosure relates to storage systems and, more specifically, to recovering storage space trapped in an extent store of a storage system.

Background Information

A plurality of storage systems may be interconnected as a cluster and configured to provide storage service relating to the organization of storage containers stored on storage devices coupled to the systems. The storage system cluster may be further configured to operate according to a client/server model of information delivery to thereby allow one or more clients (hosts) to access the storage containers. The storage devices may be embodied as solid-state drives (SSDs), such as flash storage devices, whereas the storage containers may be embodied as files or logical units (LUNs). Each storage container may be implemented as a set of data structures, such as data blocks that store data for the storage container and metadata blocks that describe the data of the storage container.

For example, the metadata may describe, e.g., map, LUN offsets to locations of the data on storage devices in the cluster. The storage systems may maintain the metadata as metadata entries of a data structure that map LUN offsets to locations of the storage container data throughout the cluster. When an input/output (I/O) request having new data is issued by a host to change existing data of a LUN, the new data may partially overlap a LUN offset range of existing data on the storage devices (as mapped by an existing metadata entry) and thus logically overwrite a portion of that existing data. The storage system may create a new metadata entry that maps the partially overlapping LUN offset range to the location of the new data and insert the new metadata entry into the data structure. The existing metadata entry may be adjusted to cover any non-overlapping portions of the existing data. However, the partially overlapping metadata entry may trap storage space (i.e., the logically overwritten portion of data) of the storage devices such that it is no longer accessible by the host.

BRIEF DESCRIPTION OF THE DRAWINGS

The above and further advantages of the embodiments herein may be better understood by referring to the following description in conjunction with the accompanying drawings in which like reference numerals indicate identically or functionally similar elements, of which:

FIG. 6 is a block diagram of various volume metadata entries;

OVERVIEW

Embodiments described herein are directed to a technique for recovering storage space trapped in an extent store due to overlapping write requests associated with metadata managed by a volume layer of a storage input/output (I/O) stack executing on one or more nodes of a cluster. The metadata is illustratively volume metadata embodied as mappings from logical block addresses (LBAs) of a logical unit (LUN) accessible by a host to durable extent keys maintained by an extent store layer of the storage I/O stack. Each extent key is a unique cluster-wide identifier associated with a storage location for an extent, which is a variable length block of data that may be aggregated from one or more write requests directed to a LBA range of the LUN. As used herein, the extent store may be viewed as a global pool of extents stored on storage arrays of the cluster. The volume metadata is illustratively organized as a multi-level dense tree metadata structure, wherein each level of the dense tree metadata structure (dense tree) includes volume metadata entries for storing the volume metadata. When a level of the dense tree is full or exceeds a threshold, the volume metadata entries of the level are merged with a next lower level of the dense tree in accordance with a dense tree merge operation.

The technique described herein may be invoked during the merge operation to process the volume metadata entries associated with the overlapping write requests at each level of the dense tree involved in the merge operation and determine the LBA (i.e., offset) range overlap of the entries. Processing of the overlapping write requests during the merge operation may manifest as partial overwrites of one or more existing extents which, in turn, may result in storage space being trapped in the extent store. The technique may leverage an algorithm employed to calculate an amount of the trapped storage space of the existing extents. The technique may then perform read-modify-write (RMW) operations on the partially overwritten extents to recapture that trapped space by, e.g., purging the existing extents consuming the trapped storage space and writing new extents having non-overlapped data. Illustratively, the storage space trapped (locked up) by the partially overwritten extents may be recovered (freed) by reading and re-writing one or more valid portions of each extent with storage space lockup through the use of "out-of-band", i.e., independent of the merge, processing of the RMW operations.

DESCRIPTION

Storage Cluster

Figure 1:
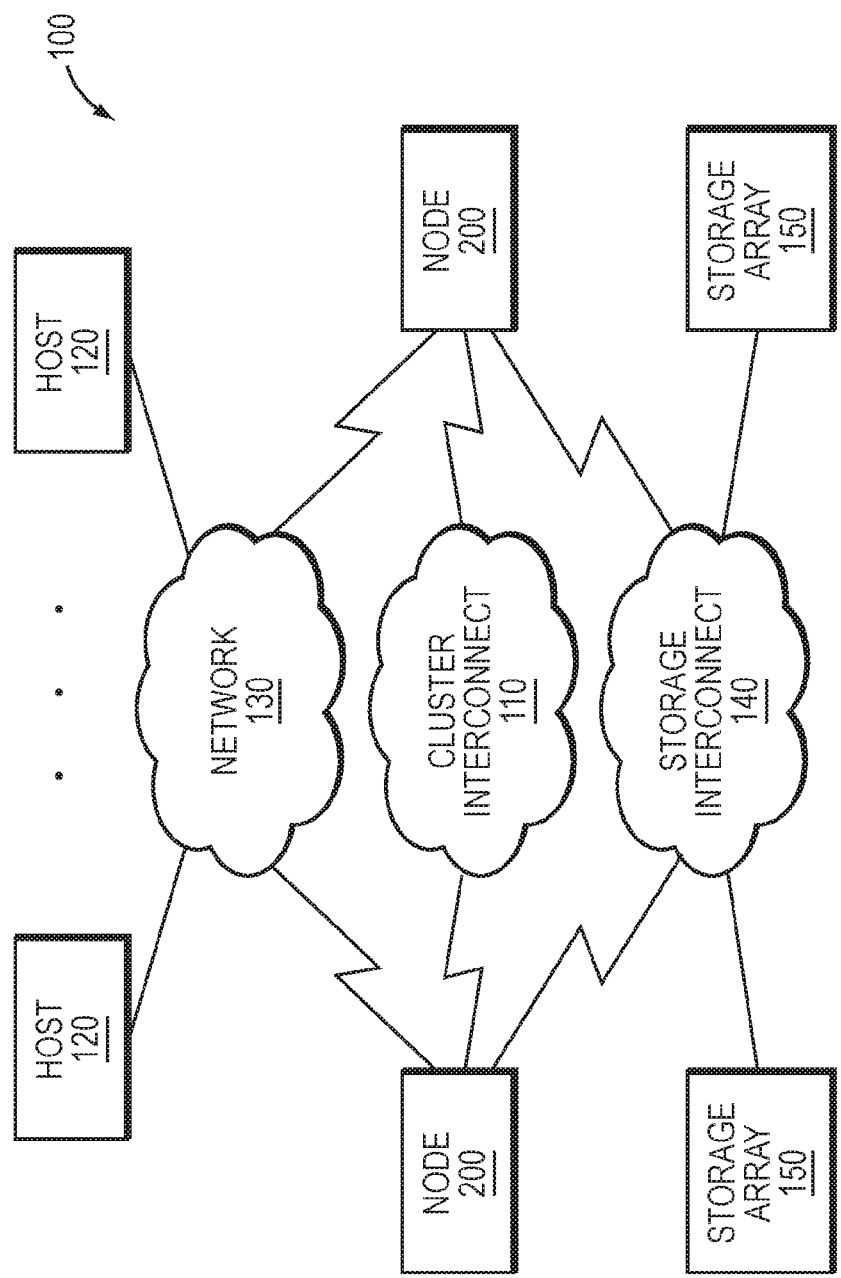
FIG. 1 is a block diagram of a plurality of nodes interconnected as a cluster.

FIG. 1 is a block diagram of a plurality of nodes 200 interconnected as a cluster 100 and configured to provide storage service relating to the organization of information on storage devices. The nodes 200 may be interconnected by a cluster interconnect fabric 110 and include functional components that cooperate to provide a distributed storage architecture of the cluster 100, which may be deployed in a storage area network (SAN). As described herein, the components of each node 200 include hardware and software functionality that enable the node to connect to one or more hosts 120 over a computer network 130, as well as to one or more storage arrays 150 of storage devices over a storage interconnect 140, to thereby render the storage service in accordance with the distributed storage architecture.

Each host 120 may be embodied as a general-purpose computer configured to interact with any node 200 in accordance with a client/server model of information delivery. That is, the client (host) may request the services of the node, and the node may return the results of the services requested by the host, by exchanging packets over the network 130. The host may issue packets including file-based access protocols, such as the Network File System (NFS) protocol over the Transmission Control Protocol/Internet Protocol (TCP/IP), when accessing information on the node in the form of storage containers such as files and directories. However, in an embodiment, the host 120 illustratively issues packets including block-based access protocols, such as the Small Computer Systems Interface (SCSI) protocol encapsulated over TCP (iSCSI) and SCSI encapsulated over FC (FCP), when accessing information in the form of storage containers such as logical units (LUNs). Notably, any of the nodes 200 may service a request directed to a storage container on the cluster 100.

Figure 2:
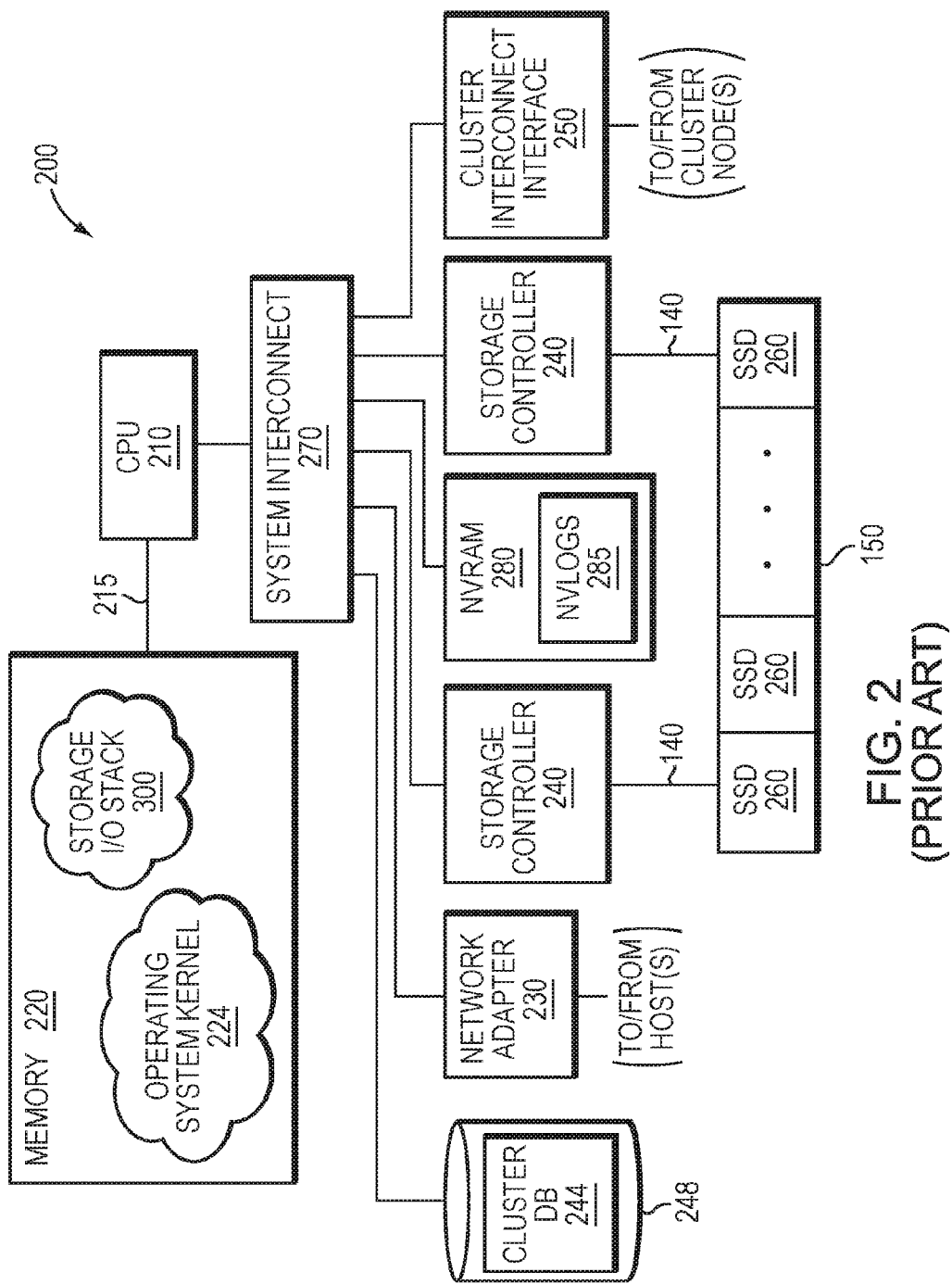
FIG. 2 is a block diagram of a node.

FIG. 2 is a block diagram of a node 200 that is illustratively embodied as a storage system having one or more central processing units (CPUs) 210 coupled to a memory 220 via a memory bus 215. The CPU 210 is also coupled to a network adapter 230, one or more storage controllers 240, a cluster interconnect interface 250 and a non-volatile random access memory (NVRAM 280) via a system interconnect 270. The network adapter 230 may include one or more ports adapted to couple the node 200 to the host(s) 120 over computer network 130, which may include point-to-point links, wide area networks, virtual private networks implemented over a public network (Internet) or a local area network. The network adapter 230 thus includes the mechanical, electrical and signaling circuitry needed to connect the node to the network 130, which illustratively embodies an Ethernet or Fibre Channel (FC) network.

The memory 220 may include memory locations that are addressable by the CPU 210 for storing software programs and data structures associated with the embodiments described herein. The CPU 210 may, in turn, include processing elements and/or logic circuitry configured to execute the software programs, such as a storage input/output (I/O) stack 300, and manipulate the data structures. Illustratively, the storage I/O stack 300 may be implemented as a set of user mode processes that may be decomposed into a plurality of threads. An operating system kernel 224, portions of which are typically resident in memory 220 (in-core) and executed by the processing elements (i.e., CPU 210), functionally organizes the node by, inter alia, invoking operations in support of the storage service implemented by the node and, in particular, the storage I/O stack 300. A suitable operating system kernel 224 may include a general-purpose operating system, such as the UNIX® series or Microsoft Windows® series of operating systems, or an operating system with configurable functionality such as microkernels and embedded kernels. However, in an embodiment described herein, the operating system kernel is illustratively the Linux® operating system. It will be apparent to those skilled in the art that other processing and memory means, including various computer readable media, may be used to store and execute program instructions pertaining to the embodiments herein.

Each storage controller 240 cooperates with the storage I/O stack 300 executing on the node 200 to access information requested by the host 120. The information is preferably stored on storage devices such as solid state drives (SSDs) 260, illustratively embodied as flash storage devices, of storage array 150. In an embodiment, the flash storage devices may be based on NAND flash components, e.g., single-layer-cell (SLC) flash, multi-layer-cell (MLC) flash or triple-layer-cell (TLC) flash, although it will be understood to those skilled in the art that other block-oriented, non-volatile, solid-state electronic devices (e.g., drives based on storage class memory components) may be advantageously used with the embodiments described herein. Accordingly, the storage devices may or may not be block-oriented (i.e., accessed as blocks). The storage controller 240 includes one or more ports having I/O interface circuitry that couples to the SSDs 260 over the storage interconnect 140, illustratively embodied as a serial attached SCSI (SAS) topology. Alternatively, other point-to-point I/O interconnect arrangements such as a conventional serial ATA (SATA) topology or a PCI topology, may be used. The system interconnect 270 may also couple the node 200 to a local service storage device 248, such as an SSD, configured to locally store cluster-related configuration information, e.g., as cluster database (DB) 244, which may be replicated to the other nodes 200 in the cluster 100.

The cluster interconnect interface 250 may include one or more ports adapted to couple the node 200 to the other node(s) of the cluster 100. In an embodiment, Ethernet may be used as the clustering protocol and interconnect fabric media, although it will be apparent to those skilled in the art that other types of protocols and interconnects, such as Infiniband, may be utilized within the embodiments described herein. The NVRAM 280 may include a back-up battery or other built-in last-state retention capability (e.g., non-volatile semiconductor memory such as storage class memory) that is capable of maintaining data in light of a failure to the node and cluster environment. Illustratively, a portion of the NVRAM 280 may be configured as one or more non-volatile logs (NVLogs 285) configured to temporarily record ("log") I/O requests, such as write requests, received from the host 120.

Storage I/O Stack

Figure 3:
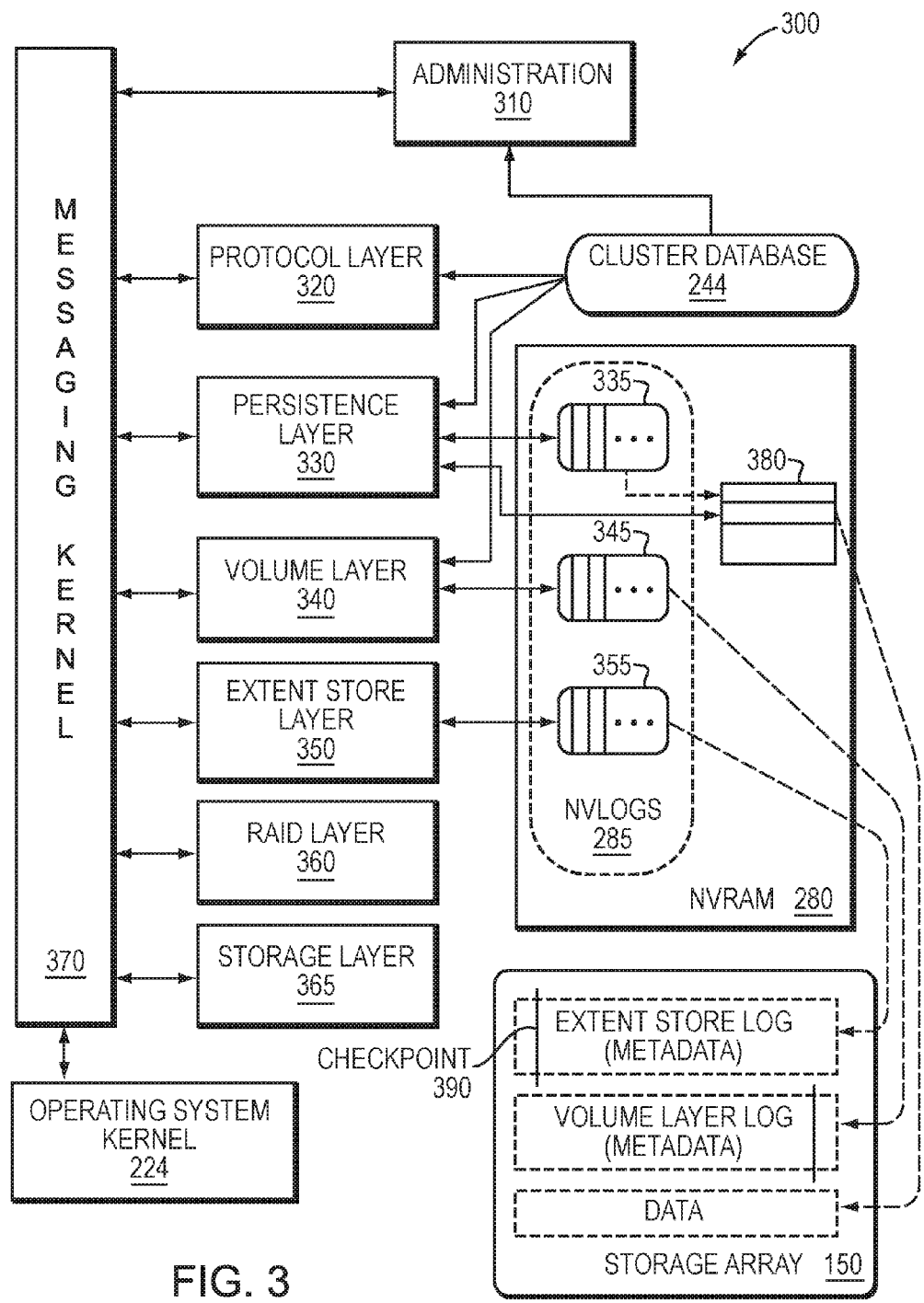
FIG. 3 is a block diagram of a storage input/output (I/O) stack of the node.

FIG. 3 is a block diagram of the storage I/O stack 300 that may be advantageously used with one or more embodiments described herein. The storage I/O stack 300 includes a plurality of software modules or layers that cooperate with other functional components of the nodes 200 to provide the distributed storage architecture of the cluster 100. In an embodiment, the distributed storage architecture presents an abstraction of a single storage container, i.e., all of the storage arrays 150 of the nodes 200 for the entire cluster 100 organized as one large pool of storage. In other words, the architecture consolidates storage, i.e., the SSDs 260 of the arrays 150, throughout the cluster (retrievable via cluster-wide keys) to enable storage of the LUNs. Both storage capacity and performance may then be subsequently scaled by adding nodes 200 to the cluster 100.

Illustratively, the storage I/O stack 300 includes an administration layer 310, a protocol layer 320, a persistence layer 330, a volume layer 340, an extent store layer 350, a Redundant Array of Independent Disks (RAID) layer 360, a storage layer 365 and a NVRAM (storing NVLogs) "layer" interconnected with a messaging kernel 370. The messaging kernel 370 may provide a message-based (or event-based) scheduling model (e.g., asynchronous scheduling) that employs messages as fundamental units of work exchanged (i.e., passed) among the layers. Suitable message-passing mechanisms provided by the messaging kernel to transfer information between the layers of the storage I/O stack 300 may include, e.g., for intra-node communication: i) messages that execute on a pool of threads, ii) messages that execute on a single thread progressing as an operation through the storage I/O stack, iii) messages using an Inter Process Communication (IPC) mechanism and, e.g., for inter-node communication: messages using a Remote Procedure Call (RPC) mechanism in accordance with a function shipping implementation. Alternatively, the I/O stack may be implemented using a thread-based or stack-based execution model. In one or more embodiments, the messaging kernel 370 allocates processing resources from the operating system kernel 224 to execute the messages. Each storage I/O stack layer may be implemented as one or more instances (i.e., processes) executing one or more threads (e.g., in kernel or user space) that process the messages passed between the layers such that the messages provide synchronization for blocking and non-blocking operation of the layers.

In an embodiment, the protocol layer 320 may communicate with the host 120 over the network 130 by exchanging discrete frames or packets configured as I/O requests according to pre-defined protocols, such as iSCSI and FCP. An I/O request, e.g., a read or write request, may be directed to a LUN and may include I/O parameters such as, inter alia, a LUN identifier (ID), a logical block address (LBA) of the LUN, a length (i.e., amount of data) and, in the case of a write request, write data. The protocol layer 320 receives the I/O request and forwards it to the persistence layer 330, which records the request into a persistent write-back cache 380, illustratively embodied as a log whose contents can be replaced randomly, e.g., under some random access replacement policy rather than only in serial fashion, and returns an acknowledgement to the host 120 via the protocol layer 320. In an embodiment only I/O requests that modify the LUN, e.g., write requests, are logged. Notably, the I/O request may be logged at the node receiving the I/O request, or in an alternative embodiment in accordance with the function shipping implementation, the I/O request may be logged at another node.

Illustratively, dedicated logs may be maintained by the various layers of the storage I/O stack 300. For example, a dedicated log 335 may be maintained by the persistence layer 330 to record the I/O parameters of an I/O request as equivalent internal, i.e., storage I/O stack, parameters, e.g., volume ID, offset, and length. In the case of a write request, the persistence layer 330 may also cooperate with the NVRAM 280 to implement the write-back cache 380 configured to store the write data associated with the write request. In an embodiment, the write-back cache 380 may be structured as a log. Notably, the write data for the write request may be physically stored in the cache 380 such that the log 335 contains the reference to the associated write data. It will be understood to persons skilled in the art the other variations of data structures may be used to store or maintain the write data in NVRAM including data structures with no logs. In an embodiment, a copy of the write-back cache may also be maintained in the memory 220 to facilitate direct memory access to the storage controllers. In other embodiments, caching may be performed at the host 120 or at a receiving node in accordance with a protocol that maintains coherency between the data stored at the cache and the cluster.

In an embodiment, the administration layer 310 may apportion the LUN into multiple volumes, each of which may be partitioned into multiple regions (e.g., allotted as disjoint block address ranges), with each region having one or more segments stored as multiple stripes on the array 150. A plurality of volumes distributed among the nodes 200 may thus service a single LUN, i.e., each volume within the LUN services a different LBA range (i.e., offset range) or set of ranges within the LUN. Accordingly, the protocol layer 320 may implement a volume mapping technique to identify a volume to which the I/O request is directed (i.e., the volume servicing the offset range indicated by the parameters of the I/O request). Illustratively, the cluster database 244 may be configured to maintain one or more associations (e.g., key-value pairs) for each of the multiple volumes, e.g., an association between the LUN ID and a volume, as well as an association between the volume and a node ID for a node managing the volume. The administration layer 310 may also cooperate with the database 244 to create (or delete) one or more volumes associated with the LUN (e.g., creating a volume ID/LUN key-value pair in the database 244). Using the LUN ID and LBA (or LBA range), the volume mapping technique may provide a volume ID (e.g., using appropriate associations in the cluster database 244) that identifies the volume and node servicing the volume destined for the request, as well as translate the LBA (or LBA range) into an offset and length within the volume. Specifically, the volume ID is used to determine a volume layer instance that manages volume metadata associated with the LBA or LBA range. As noted, the protocol layer 320 may pass the I/O request (i.e., volume ID, offset and length) to the persistence layer 330, which may use the function shipping (e.g., inter-node) implementation to forward the I/O request to the appropriate volume layer instance executing on a node in the cluster based on the volume ID.

In an embodiment, the volume layer 340 may manage the volume metadata by, e.g., maintaining states of host-visible containers, such as ranges of LUNs, and performing data management functions, such as creation of snapshots and clones, for the LUNs in cooperation with the administration layer 310. The volume metadata is illustratively embodied as in-core mappings from LUN addresses (i.e., LBAs) to durable extent keys, which are unique cluster-wide IDs associated with SSD storage locations for extents within an extent key space of the cluster-wide storage container. That is, an extent key may be used to retrieve the data of the extent at an SSD storage location associated with the extent key. Alternatively, there may be multiple storage containers in the cluster wherein each container has its own extent key space, e.g., where the administration layer 310 provides distribution of extents among the storage containers. An extent is a variable length block of data that provides a unit of storage on the SSDs and that need not be aligned on any specific boundary, i.e., it may be byte aligned. Accordingly, an extent may be an aggregation of write data from a plurality of write requests to maintain such alignment. Illustratively, the volume layer 340 may record the forwarded request (e.g., information or parameters characterizing the request), as well as changes to the volume metadata, in dedicated log 345 maintained by the volume layer 340. Subsequently, the contents of the volume layer log 345 may be written to the storage array 150 in accordance with a checkpoint (e.g., synchronization) operation that stores in-core metadata on the array 150. That is, the checkpoint operation (checkpoint) ensures that a consistent state of metadata, as processed in-core, is committed to (i.e., stored on) the storage array 150; whereas the retirement of log entries ensures that the entries accumulated in the volume layer log 345 synchronize with the metadata checkpoints committed to the storage array 150 by, e.g., retiring those accumulated log entries that are prior to the checkpoint. In one or more embodiments, the checkpoint and retirement of log entries may be data driven, periodic or both.

In an embodiment, the extent store layer 350 is responsible for storing extents prior to storage on the SSDs 260 (i.e., on the storage array 150) and for providing the extent keys to the volume layer 340 (e.g., in response to a forwarded write request). The extent store layer 350 is also responsible for retrieving data (e.g., an existing extent) using an extent key (e.g., in response to a forwarded read request). The extent store layer 350 may be responsible for performing de-duplication and compression on the extents prior to storage. The extent store layer 350 may maintain in-core mappings (e.g., embodied as hash tables) of extent keys to SSD storage locations (e.g., offset on an SSD 260 of array 150). The extent store layer 350 may also maintain a dedicated log 355 of entries that accumulate requested "put" and "delete" operations (i.e., write requests and delete requests for extents issued from other layers to the extent store layer 350), where these operations change the in-core mappings (i.e., hash table entries). Subsequently, the in-core mappings and contents of the extent store layer log 355 may be written to the storage array 150 in accordance with a "fuzzy" checkpoint 390 (i.e., checkpoint with incremental changes recorded in one or more log files) in which selected in-core mappings, less than the total, are committed to the array 150 at various intervals (e.g., driven by an amount of change to the in-core mappings, size thresholds of log 355, or periodically). Notably, the accumulated entries in log 355 may be retired once all in-core mappings have been committed to include the changes recorded in those entries prior to the first interval.

In an embodiment, the RAID layer 360 may organize the SSDs 260 within the storage array 150 as one or more RAID groups (e.g., sets of SSDs) that enhance the reliability and integrity of extent storage on the array by writing data "stripes" having redundant information, i.e., appropriate parity information with respect to the striped data, across a given number of SSDs 260 of each RAID group. The RAID layer 360 may also store a number of stripes (e.g., stripes of sufficient depth) at once, e.g., in accordance with a plurality of contiguous write operations, so as to reduce data relocation (i.e., internal flash block management) that may occur within the SSDs as a result of the operations. In an embodiment, the storage layer 365 implements storage I/O drivers that may communicate directly with hardware (e.g., the storage controllers and cluster interface) cooperating with the operating system kernel 224, such as a Linux virtual function I/O (VFIO) driver.

Write Path

Figure 4:
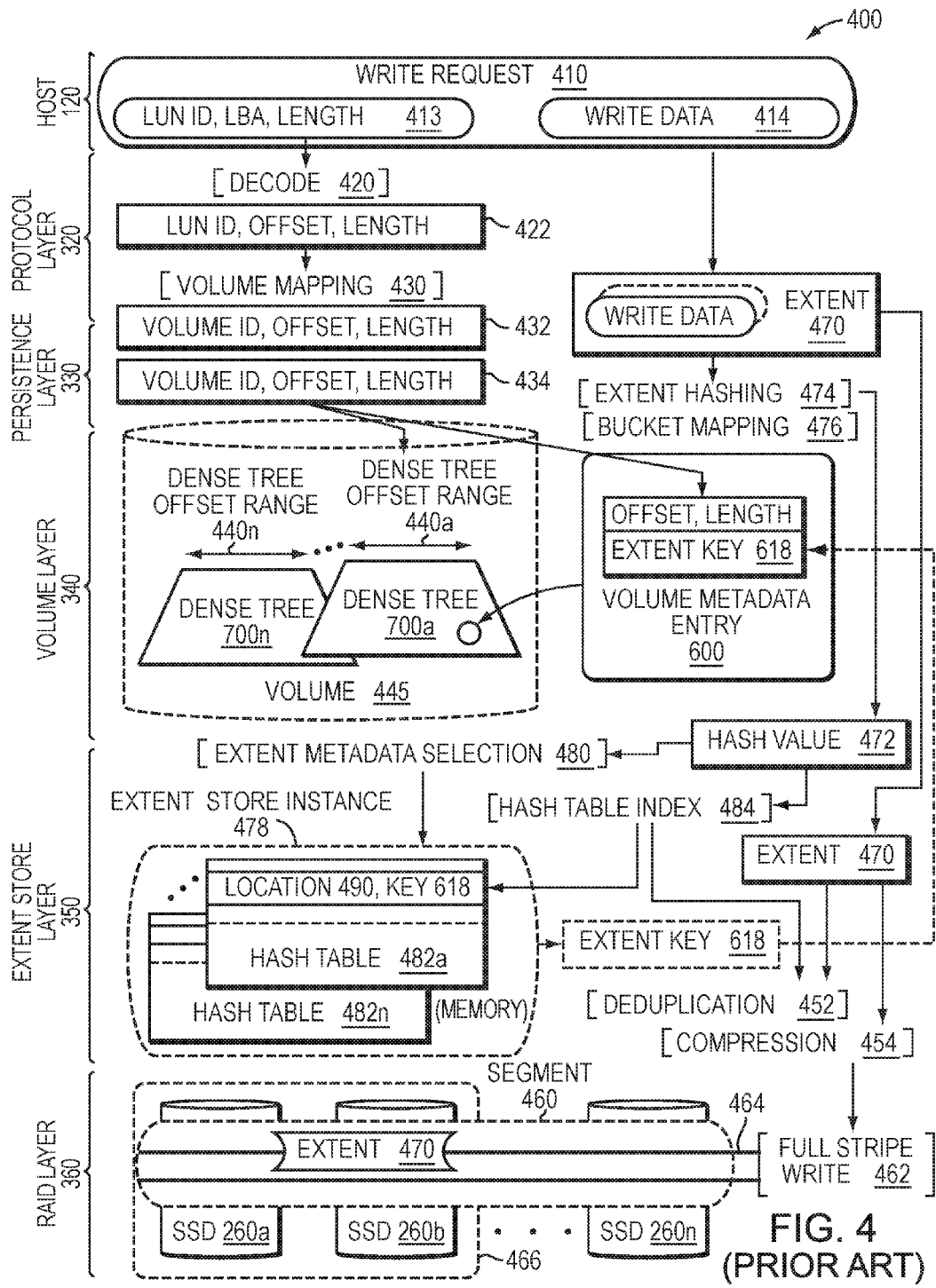
FIG. 4 illustrates a write path of the storage I/O stack.

FIG. 4 illustrates an I/O (e.g., write) path 400 of the storage I/O stack 300 for processing an I/O request, e.g., a SCSI write request 410. The write request 410 may be issued by host 120 and directed to a LUN stored on the storage array 150 of the cluster 100. Illustratively, the protocol layer 320 receives and processes the write request by decoding 420 (e.g., parsing and extracting) fields of the request, e.g., LUN ID, LBA and length (shown at 413), as well as write data 414. The protocol layer may use the results 422 from decoding 420 for a volume mapping technique 430 (described above) that translates the LUN ID and LBA range (i.e., equivalent offset and length) of the write request to an appropriate volume layer instance, i.e., volume ID (volume 445), in the cluster 100 that is responsible for managing volume metadata for the LBA range. In an alternative embodiment, the persistence layer 330 may implement the above described volume mapping technique 430. The protocol layer then passes the results 432, e.g., volume ID, offset, length (as well as write data), to the persistence layer 330, which records the request in the persistent layer log 335 and returns an acknowledgement to the host 120 via the protocol layer 320. The persistence layer 330 may aggregate and organize write data 414 from one or more write requests into a new extent 470 and perform a hash computation, i.e., a hash function, on the new extent to generate a hash value 472 in accordance with an extent hashing technique 474.

The persistent layer 330 may then pass the write request with aggregated write date including, e.g., the volume ID, offset and length, as parameters 434 of a message to the appropriate volume layer instance. In an embodiment, message passing of the parameters 434 (received by the persistent layer) may be redirected to another node via the function shipping mechanism, e.g., RPC, for inter-node communication. Alternatively, message passing of parameters 434 may be via the IPC mechanism, e.g., message threads, for intra-node communication.

In one or more embodiments, a bucket mapping technique 476 is provided that translates the hash value 472 to an instance of an appropriate extent store layer (e.g., extent store instance 478) that is responsible for storing the new extent 470. Note that the bucket mapping technique may be implemented in any layer of the storage I/O stack above the extent store layer. In an embodiment, for example, the bucket mapping technique may be implemented in the persistence layer 330, the volume layer 340, or a layer that manages cluster-wide information, such as a cluster layer (not shown). Accordingly, the persistence layer 330, the volume layer 340, or the cluster layer may contain computer executable instructions executed by the CPU 210 to perform operations that implement the bucket mapping technique 476. The persistence layer 330 may then pass the hash value 472 and the new extent 470 to the appropriate volume layer instance and onto the appropriate extent store instance via an extent store put operation. The extent hashing technique 474 may embody an approximately uniform hash function to ensure that any random extent to be written may have an approximately equal chance of falling into any extent store instance 478, i.e., hash buckets are distributed across extent store instances of the cluster 100 based on available resources. As a result, the bucket mapping technique 476 provides load-balancing of write operations (and, by symmetry, read operations) across nodes 200 of the cluster, while also leveling flash wear in the SSDs 260 of the cluster.

In response to the put operation, the extent store instance may process the hash value 472 to perform an extent metadata selection technique 480 that (i) selects an appropriate hash table 482 (e.g., hash table 482*a*) from a set of hash tables (illustratively in-core) within the extent store instance 478, and (ii) extracts a hash table index 484 from the hash value 472 to index into the selected hash table and lookup a table entry having an extent key 618 identifying a storage location 490 on SSD 260 for the extent. Accordingly, the extent store layer 350 contains computer executable instructions executed by the CPU 210 to perform operations that implement the extent metadata selection technique 480 described herein. If a table entry with a matching extent key is found, then the SSD location 490 mapped from the extent key 618 is used to retrieve an existing extent (not shown) from SSD. The existing extent is then compared with the new extent 470 to determine whether their data is identical. If the data is identical, the new extent 470 is already stored on SSD 260 and a de-duplication opportunity (denoted de-duplication 452) exists such that there is no need to write another copy of the data. Accordingly, a reference count (not shown) in the table entry for the existing extent is incremented and the extent key 618 of the existing extent is passed to the appropriate volume layer instance for storage within an entry (denoted as volume metadata entry 600) of a dense tree metadata structure (e.g., dense tree 700a), such that the extent key 618 is associated an offset range 440 (e.g., offset range 440a) of the volume 445.

However, if the data of the existing extent is not identical to the data of the new extent 470, a collision occurs and a deterministic algorithm is invoked to sequentially generate as many new candidate extent keys (not shown) mapping to the same bucket as needed to either provide de-duplication 452 or produce an extent key that is not already stored within the extent store instance. Notably, another hash table (e.g. hash table 482n) may be selected by a new candidate extent key in accordance with the extent metadata selection technique 480. In the event that no de-duplication opportunity exists (i.e., the extent is not already stored) the new extent 470 is compressed in accordance with compression technique 454 and passed to the RAID layer 360, which processes the new extent 470 for storage on SSD 260 within one or more stripes 464 of RAID group 466. The extent store instance may cooperate with the RAID layer 360 to identify a storage segment 460 (i.e., a portion of the storage array 150) and a location on SSD 260 within the segment 460 in which to store the new extent 470. Illustratively, the identified storage segment is a segment with a large contiguous free space having, e.g., location 490 on SSD 260b for storing the extent 470.

In an embodiment, the RAID layer 360 then writes the stripe 464 across the RAID group 466, illustratively as one or more full stripe writes 462. The RAID layer 360 may write a series of stripes 464 of sufficient depth to reduce data relocation that may occur within the flash-based SSDs 260 (i.e., flash block management). The extent store instance then (i) loads the SSD location 490 of the new extent 470 into the selected hash table 482n (i.e., as selected by the new candidate extent key), (ii) passes a new extent key (denoted as extent key 618) to the appropriate volume layer instance for storage within an entry (also denoted as volume metadata entry 600) of a dense tree 700 managed by that volume layer instance, and (iii) records a change to extent metadata of the selected hash table in the extent store layer log 355. Illustratively, the volume layer instance selects dense tree 700a spanning an offset range 440a of the volume 445 that encompasses the LBA range of the write request. As noted, the volume 445 (e.g., an offset space of the volume) is partitioned into multiple regions (e.g., allotted as disjoint offset ranges); in an embodiment, each region is represented by a dense tree 700. The volume layer instance then inserts the volume metadata entry 600 into the dense tree 700a and records a change corresponding to the volume metadata entry in the volume layer log 345. Accordingly, the I/O (write) request is sufficiently stored on SSD 260 of the cluster.

Read Path

Figure 5:
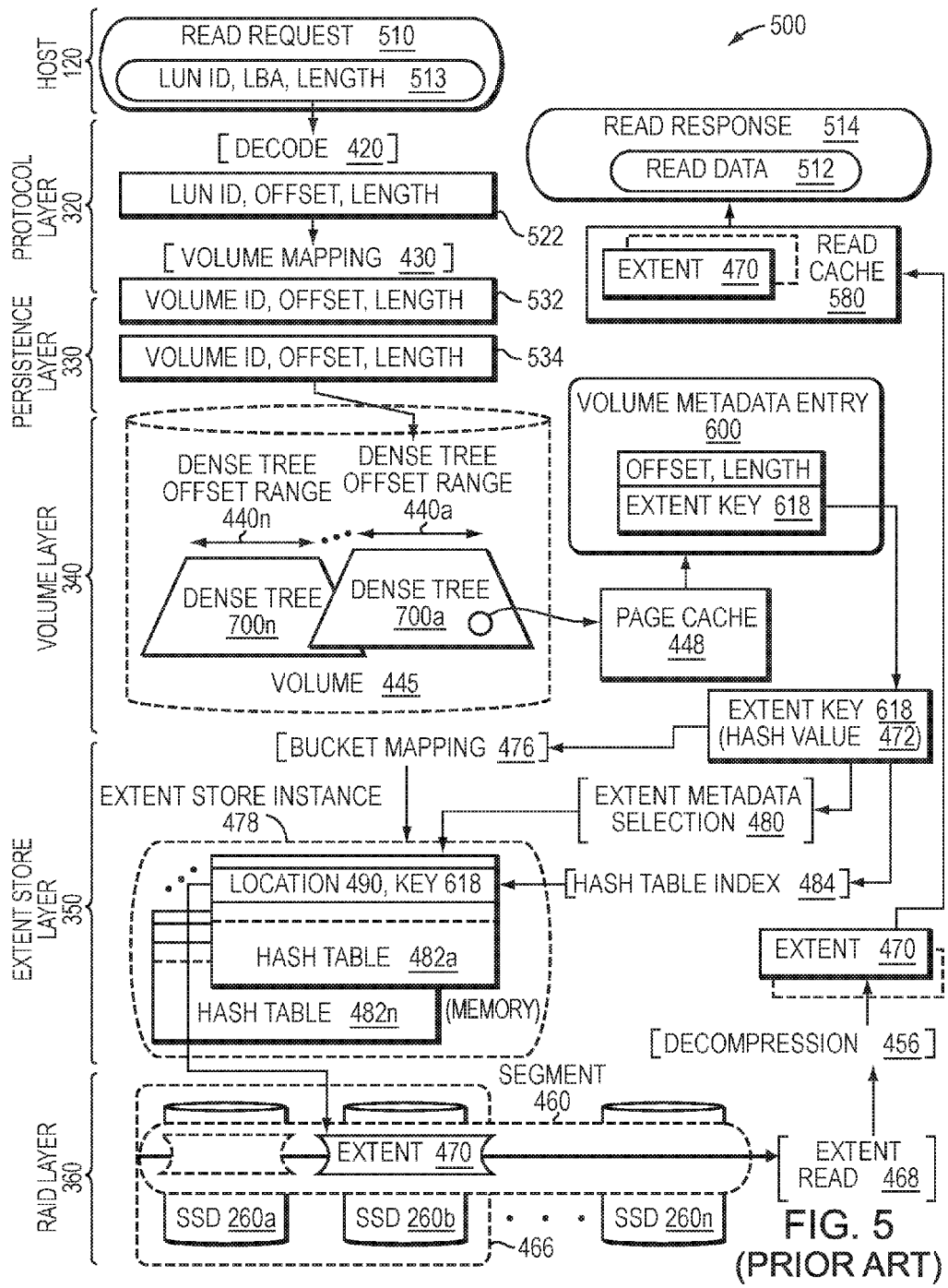
FIG. 5 illustrates a read path of the storage I/O stack.

FIG. 5 illustrates an I/O (e.g., read) path 500 of the storage I/O stack 300 for processing an I/O request, e.g., a SCSI read request 510. The read request 510 may be issued by host 120 and received at the protocol layer 320 of a node 200 in the cluster 100. Illustratively, the protocol layer 320 processes the read request by decoding 420 (e.g., parsing and extracting) fields of the request, e.g., LUN ID, LBA, and length (shown at 513), and uses the results 522, e.g., LUN ID, offset, and length, for the volume mapping technique 430. That is, the protocol layer 320 may implement the volume mapping technique 430 (described above) to translate the LUN ID and LBA range (i.e., equivalent offset and length) of the read request to an appropriate volume layer instance, i.e., volume ID (volume 445), in the cluster 100 that is responsible for managing volume metadata for the LBA (i.e., offset) range. The protocol layer then passes the results 532 to the persistence layer 330, which may search the write cache 380 to determine whether some or all of the read request can be serviced from its cached data. If the entire request cannot be serviced from the cached data, the persistence layer 330 may then pass the remaining portion of the request including, e.g., the volume ID, offset and length, as parameters 534 to the appropriate volume layer instance in accordance with the function shipping mechanism (e.g., RPC for inter-node communication) or the IPC mechanism (e.g., message threads, for intra-node communication).

The volume layer instance may process the read request to access a dense tree metadata structure (e.g., dense tree 700a) associated with a region (e.g., offset range 440a) of a volume 445 that encompasses the requested offset range (specified by parameters 534). The volume layer instance may further process the read request to search for (lookup) one or more volume metadata entries 600 of the dense tree 700a to obtain one or more extent keys 618 associated with one or more extents 470 within the requested offset range. As described further herein, each dense tree 700 may be embodied as a multiple levels of a search structure with possibly overlapping offset range entries at each level. The entries, i.e., volume metadata entries 600, provide mappings from host-accessible LUN addresses, i.e., LBAs, to durable extent keys. The various levels of the dense tree may have volume metadata entries 600 for the same offset, in which case the higher level has the newer entry and is used to service the read request. A top level of the dense tree 700 is illustratively resident in-core and a page cache 448 may be used to access lower levels of the tree. If the requested range or portion thereof is not present in the top level, a metadata page associated with an index entry at the next lower tree level is accessed. The metadata page (i.e., in the page cache 448) at the next level is then searched (e.g., a binary search) to find any overlapping entries. This process is then iterated until one or more volume metadata entries 600 of a level are found to ensure that the extent key(s) 618 for the entire requested read range are found. If no metadata entries exist for the entire or portions of the requested read range, then the missing portion(s) are zero filled.

Once found, each extent key 618 is processed by the volume layer 340 to, e.g., implement the bucket mapping technique 476 that translates the extent key to an appropriate extent store instance 478 responsible for storing the requested extent 470. Note that, in an embodiment, each extent key 618 is substantially identical to hash value 472 associated with the extent 470, i.e., the hash value as calculated during the write request for the extent, such that the bucket mapping 476 and extent metadata selection 480 techniques may be used for both write and read path operations. Note also that the extent key 618 may be derived from the hash value 472. The volume layer 340 may then pass the extent key 618 (i.e., the hash value 472 from a previous write request for the extent) to the appropriate extent store instance 478 (via an extent store get operation), which performs an extent key-to-SSD mapping to determine the location on SSD 260 for the extent.

In response to the get operation, the extent store instance may process the extent key 618 (i.e., hash value 472) to perform the extent metadata selection technique 480 that (i) selects an appropriate hash table (e.g., hash table 482a) from a set of hash tables within the extent store instance 478, and (ii) extracts a hash table index 484 from the extent key 618 (i.e., hash value 472) to index into the selected hash table and lookup a table entry having a matching extent key 618 that identifies a storage location 490 on SSD 260 for the extent 470. That is, the SSD location 490 mapped to the extent key 618 may be used to retrieve the existing extent (denoted as extent 470) from SSD 260 (e.g., SSD 260b). The extent store instance then cooperates with the RAID storage layer 360 to access the extent on SSD 260b and retrieve the data contents in accordance with the read request. Illustratively, the RAID layer 360 may read the extent in accordance with an extent read operation 468 and pass the extent 470 to the extent store instance. The extent store instance may then decompress the extent 470 in accordance with a decompression technique 456, although it will be understood to those skilled in the art that decompression can be performed at any layer of the storage I/O stack 300. The extent 470 may be stored in a buffer (not shown) in memory 220 and a reference to that buffer may be passed back through the layers of the storage I/O stack. The persistence layer may then load the extent into a read cache 580 (or other staging mechanism) and may extract appropriate read data 512 from the read cache 580 for the LBA range of the read request 510. Thereafter, the protocol layer 320 may create a SCSI read response 514, including the read data 512, and return the read response to the host 120.

Dense Tree Volume Metadata

As noted, a host-accessible LUN may be apportioned into multiple volumes, each of which may be partitioned into one or more regions, wherein each region is associated with a disjoint offset range, i.e., a LBA range, owned by an instance of the volume layer 340 executing on a node 200. For example, assuming a maximum volume size of 64 terabytes (TB) and a region size of 16 gigabytes (GB), a volume may have up to 4096 regions (i.e., 16 GB×4096=64 TB). In an embodiment, region 1 may be associated with an offset range of, e.g., 0-16 GB, region 2 may be associated with an offset range of 16 GB-32 GB, and so forth. Ownership of a region denotes that the volume layer instance manages metadata, i.e., volume metadata, for the region, such that I/O requests destined to an offset range within the region are directed to the owning volume layer instance. Thus, each volume layer instance manages volume metadata for, and handles I/O requests to, one or more regions. A basis for metadata scale-out in the distributed storage architecture of the cluster 100 includes partitioning of a volume into regions and distributing of region ownership across volume layer instances of the cluster.

Volume metadata, as well as data storage, in the distributed storage architecture is illustratively extent based. The volume metadata of a region that is managed by the volume layer instance is illustratively embodied as in memory (in-core) and on SSD (on-flash) volume metadata configured to provide mappings from host-accessible LUN addresses, i.e., LBAs, of the region to durable extent keys. In other words, the volume metadata maps LBA (i.e., offset) ranges of the LUN to data of the LUN (via extent keys) within the respective LBA range. In an embodiment, the volume layer organizes the volume metadata (embodied as volume metadata entries 600) as a data structure, i.e., a dense tree metadata structure (dense tree 700), which maps an offset range within the region to one or more extent keys. That is, LUN data (user data) stored as extents (accessible via extent keys) is associated with LUN offset (i.e., LBA) ranges represented as volume metadata (also stored as extents). Accordingly, the volume layer 340 contains computer executable instructions executed by the CPU 210 to perform operations that organize and manage the volume metadata entries of the dense tree metadata structure described herein.

FIG. 6 is a block diagram of various volume metadata entries 600 of the dense tree metadata structure. Each volume metadata entry 600 of the dense tree 700 may be a descriptor that embodies one of a plurality of types, including a data entry (D) 610, an index entry (I) 620, and a hole entry (H) 630. The data entry (D) 610 is configured to map (offset, length) to an extent key for an extent (user data) and includes the following content: type 612, offset 614, length 616 and extent key 618. The index entry (I) 620 is configured to map (offset, length) to a page key (e.g., an extent key) of a metadata page (stored as an extent), i.e., a page containing one or more volume metadata entries, at a next lower level of the dense tree; accordingly, the index entry 620 includes the following content: type 622, offset 624, length 626 and page key 628. Illustratively, the index entry 620 manifests as a pointer from a higher level to a lower level, i.e., the index entry 620 essentially serves as linkage between the different levels of the dense tree. The hole entry (H) 630 represents absent data as a result of a hole punching operation at (offset, length) and includes the following content: type 632, offset 634, and length 636.

In an embodiment, the volume metadata entry types are of a fixed size (e.g., 12 bytes including a type field of 1 byte, an offset of 4 bytes, a length of 1 byte, and a key of 6 bytes) to facilitate search of the dense tree metadata structure as well as storage on metadata pages. Thus, some types may have unused portions, e.g., the hole entry 630 includes less information than the data entry 610 and so may have one or more unused bytes. In an alternative embodiment, the entries may be variable in size to avoid unused bytes. Advantageously, the volume metadata entries may be sized for in-core space efficiency (as well as alignment on metadata pages), which improves both read and write amplification for operations. For example, the length field (616, 626, 636) of the various volume metadata entry types may represent a unit of sector size, such as 512 bytes or 520 bytes, such that a 1 byte length may represent a range of 255×512 bytes=128K bytes.

Figure 7:
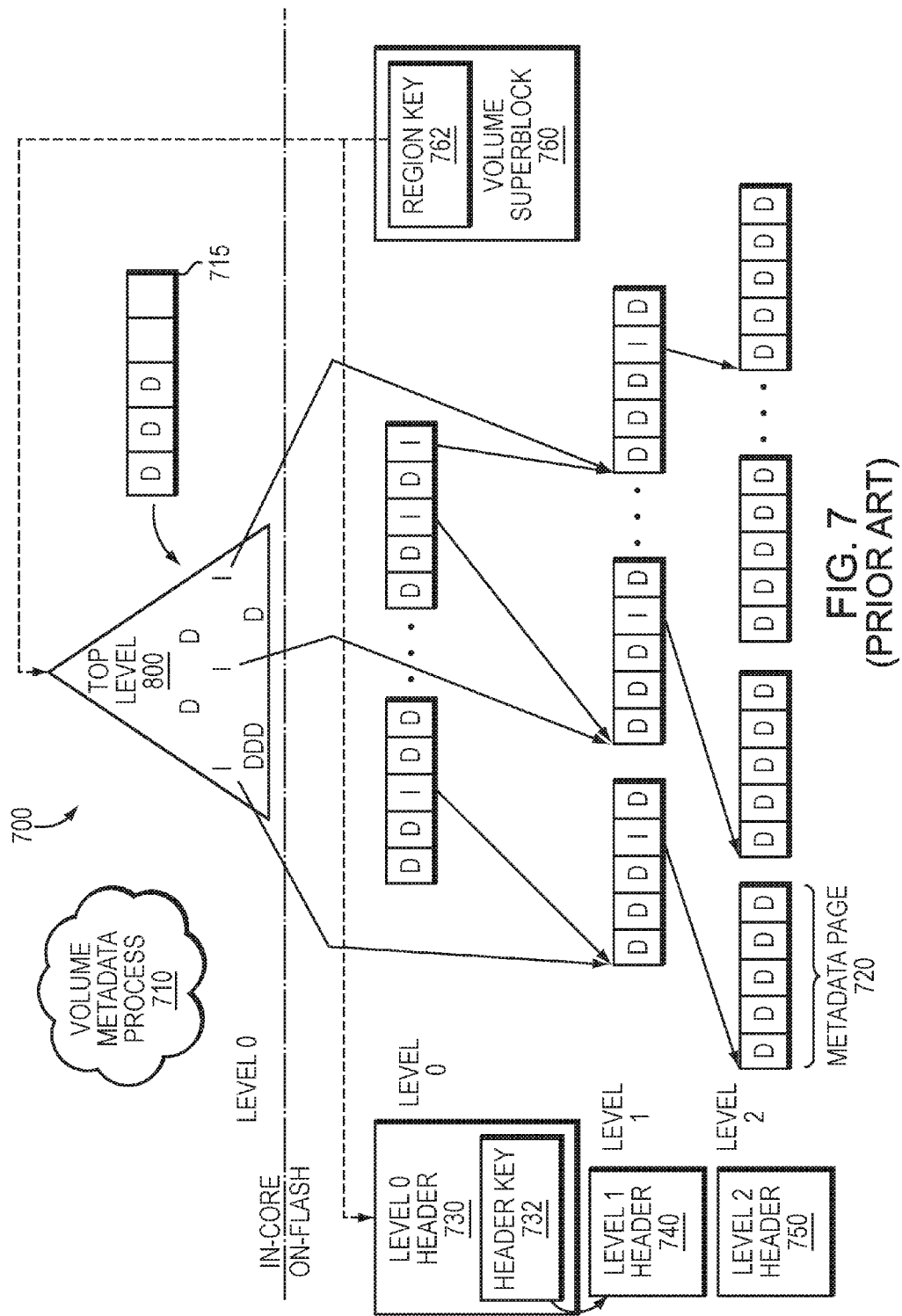
FIG. 7 is a block diagram of a dense tree metadata structure.

FIG. 7 is a block diagram of the dense tree metadata structure that may be advantageously used with one or more embodiments described herein. The dense tree metadata structure 700 is configured to provide mappings of logical offsets within a LUN (or volume) to extent keys managed by one or more extent store instances. Illustratively, the dense tree metadata structure is organized as a multi-level dense tree 700, where a top level 800 represents recent volume metadata changes and subsequent descending levels represent older changes. Specifically, a higher level of the dense tree 700 is updated first and, when that level fills, an adjacent lower level is updated, e.g., via a merge operation. A latest version of the changes may be searched starting at the top level of the dense tree and working down to the descending levels. Each level of the dense tree 700 includes fixed size records or entries, i.e., volume metadata entries 600, for storing the volume metadata. A volume metadata process 710 illustratively maintains the top level 800 of the dense tree in memory (in-core) as a balanced tree that enables indexing by offsets. The volume metadata process 710 also maintains a fixed sized (e.g., 4 KB) in-core buffer as a staging area (i.e., an in-core staging buffer 715) for volume metadata entries 600 inserted into the balanced tree (i.e., top level 800). Each level of the dense tree is further maintained on-flash as a packed array of volume metadata entries, wherein the entries are stored as extents illustratively organized as fixed sized (e.g., 4 KB) metadata pages 720. Notably, the staging buffer 715 is de-staged to SSD upon a trigger, e.g., the staging buffer is full. Each metadata page 720 has a unique identifier (ID), which guarantees that no two metadata pages can have the same content. Illustratively, metadata may not be de-duplicated by the extent store layer 350.

In an embodiment, the multi-level dense tree 700 includes three (3) levels, although it will be apparent to those skilled in the art that additional levels N of the dense tree may be included depending on parameters (e.g., size) of the dense tree configuration. Illustratively, the top level 800 of the tree is maintained in-core as level 0 and the lower levels are maintained on-flash as levels 1 and 2. In addition, copies of the volume metadata entries 600 stored in staging buffer 715 may also be maintained on-flash as, e.g., a level 0 linked list. A leaf level, e.g., level 2, of the dense tree contains data entries 610, whereas a non-leaf level, e.g., level 0 or 1, may contain both data entries 610 and index entries 620. Each index entry (I) 620 at level N of the tree is configured to point to (reference) a metadata page 720 at level N+1 of the tree. Each level of the dense tree 600 also includes a header (e.g., level 0 header 730, level 1 header 740 and level 2 header 750) that contains per level information, such as reference counts associated with the extents. Each upper level header contains a header key (an extent key for the header, e.g., header key 732 of level 0 header 730) to a corresponding lower level header. A region key 762 to a root, e.g., level 0 header 730 (and top level 800), of the dense tree 700 is illustratively stored on-flash and maintained in a volume root extent, e.g., a volume superblock 760. Notably, the volume superblock 760 contains region keys to the roots of the dense tree metadata structures for all regions in a volume.

Figure 8:
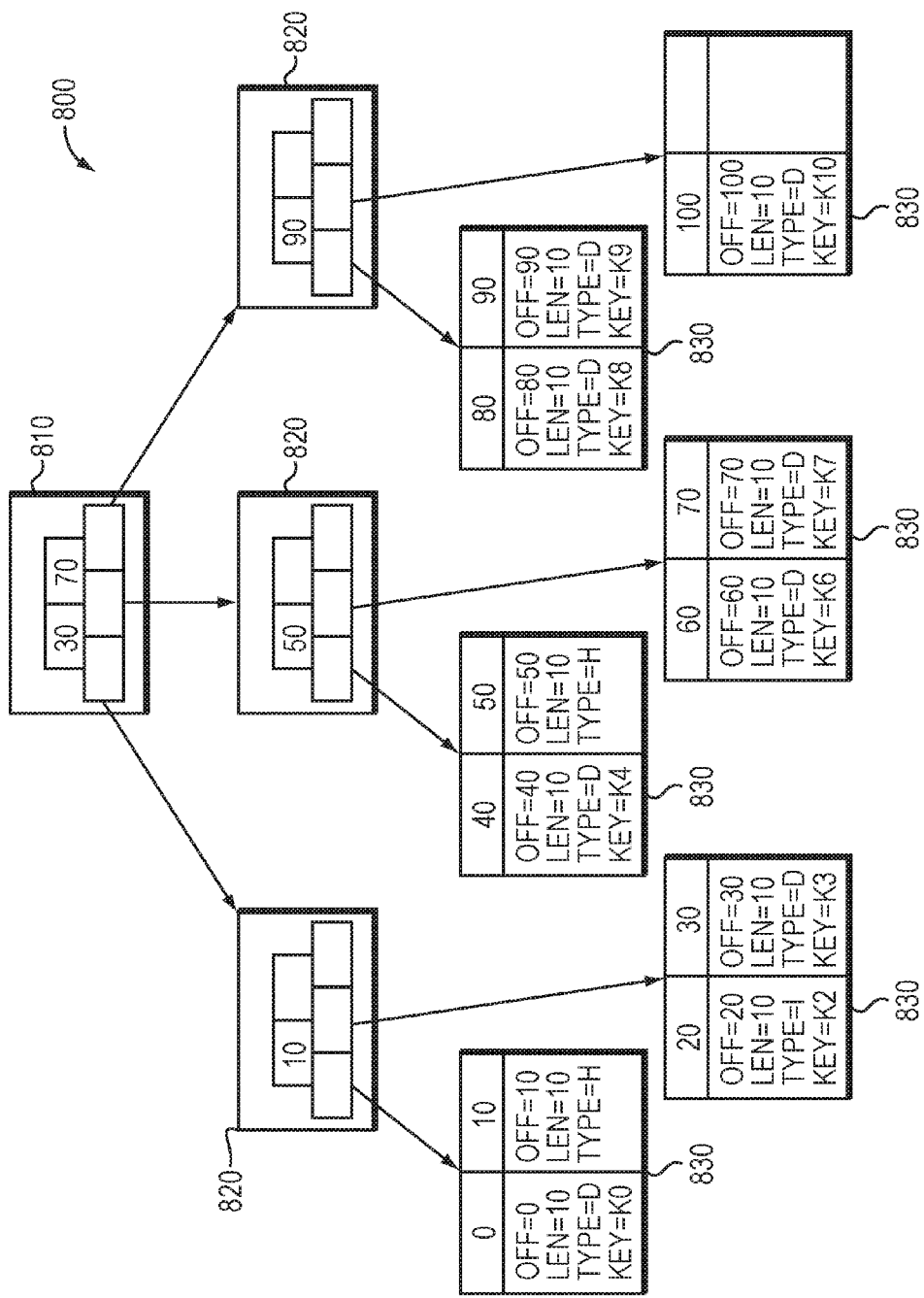
FIG. 8 is a block diagram of a top level of the dense tree metadata structure.

FIG. 8 is a block diagram of the top level 800 of the dense tree metadata structure. As noted, the top level (level 0) of the dense tree 700 is maintained in-core as a balanced tree, which is illustratively embodied as a B+ tree data structure. However, it will be apparent to those skilled in the art that other data structures, such as AVL trees, Red-Black trees, and heaps (partially sorted trees), may be advantageously used with the embodiments described herein. The B+ tree (top level 800) includes a root node 810, one or more internal nodes 820 and a plurality of leaf nodes (leaves) 830. The volume metadata stored on the tree is preferably organized in a manner that is efficient both to search, in order to service read requests and to traverse (walk) in ascending order of offset to accomplish merges to lower levels of the tree. The B+ tree has certain properties that satisfy these requirements, including storage of all data (i.e., volume metadata entries 600) in leaves 830 and storage of the leaves as sequentially accessible, e.g., as one or more linked lists. Both of these properties make sequential read requests for write data (i.e., extents) and read operations for dense tree merge more efficient. Also, since it has a much higher fan-out than a binary search tree, the illustrative B+ tree results in more efficient lookup operations. As an optimization, the leaves 830 of the B+ tree may be stored in a page cache 448, making access of data more efficient than other trees. In addition, resolution of overlapping offset entries in the B+ tree optimizes read requests of extents. Accordingly, the larger the fraction of the B+ tree (i.e., volume metadata) maintained in-core, the less loading (reading) of metadata from SSD is required so as to reduce read amplification.

Figure 9:
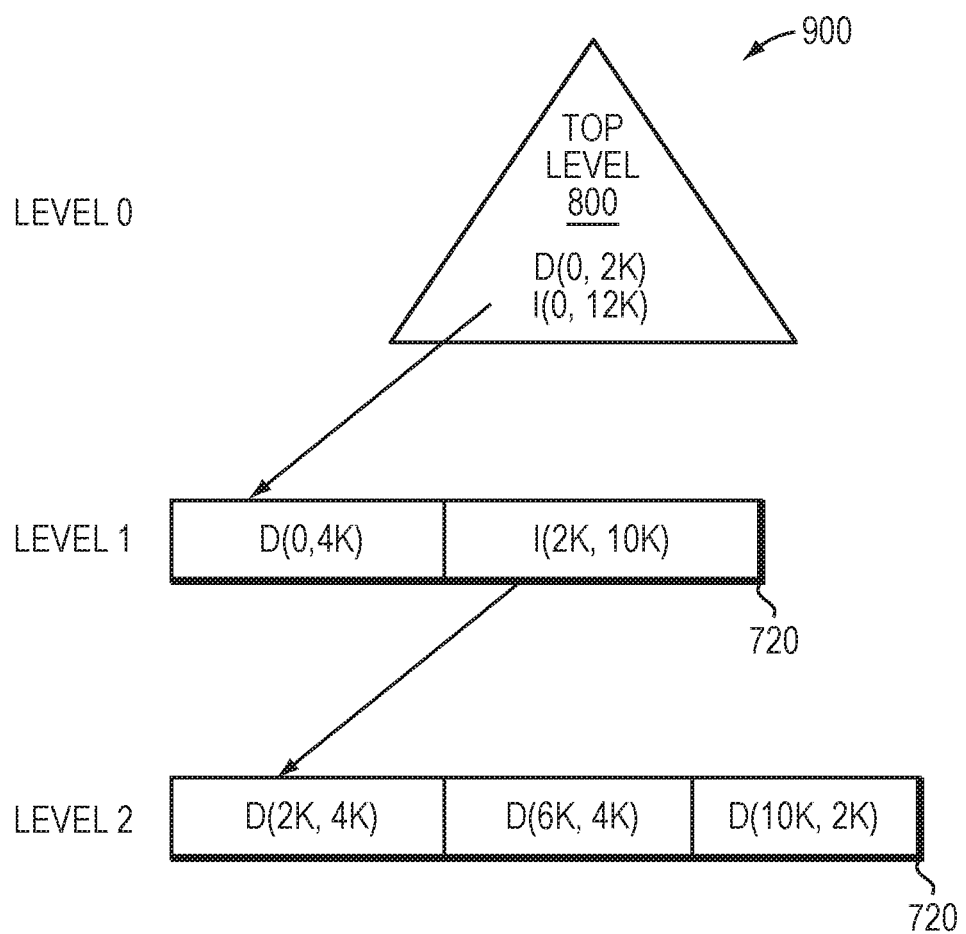
FIG. 9 illustrates mapping between levels of the dense tree metadata structure.

FIG. 9 illustrates mappings 900 between levels of the dense tree metadata structure. Each level of the dense tree 700 includes one or more metadata pages 720, each of which contains multiple volume metadata entries 600. As noted, each volume metadata entry 600 has a fixed size, e.g., 12 bytes, such that a predetermined number of entries may be packed into each metadata page 720. The data entry (D) 610 is a map of (offset, length) to an address of (user) data which is retrievable using an extent key 618 (i.e., from an extent store instance). The (offset, length) illustratively specifies an offset range of a LUN. The index entry (I) 620 is a map of (offset, length) to a page key 628 of a metadata page 720 at the next lower level. Illustratively, the offset in the index entry (I) 620 is the same as the offset of the first entry in the metadata page 720 at the next lower level. The length 626 in the index entry 620 is illustratively the cumulative length of all entries in the metadata page 720 at the next lower level (including gaps between entries).

For example, the metadata page 720 of level 1 includes an index entry "I(2K,10K)" that specifies a starting offset 2K and an ending offset 12K (i.e., 12K=2K+10K); the index entry (I) illustratively points to a metadata page 720 of level 2 covering the specified range. An aggregate view of the data entries (D) packed in the metadata page 720 of level 2 covers the mapping from the smallest offset (e.g., 2K) to the largest offset (e.g., 12K). Thus, each level of the dense tree 700 may be viewed as an overlay of an underlying level. For instance the data entry "D(0,4K)" of level 1 overlaps 2K of the underlying metadata in the page of level 2 (i.e., the range 2K,4K).

Figure 10:
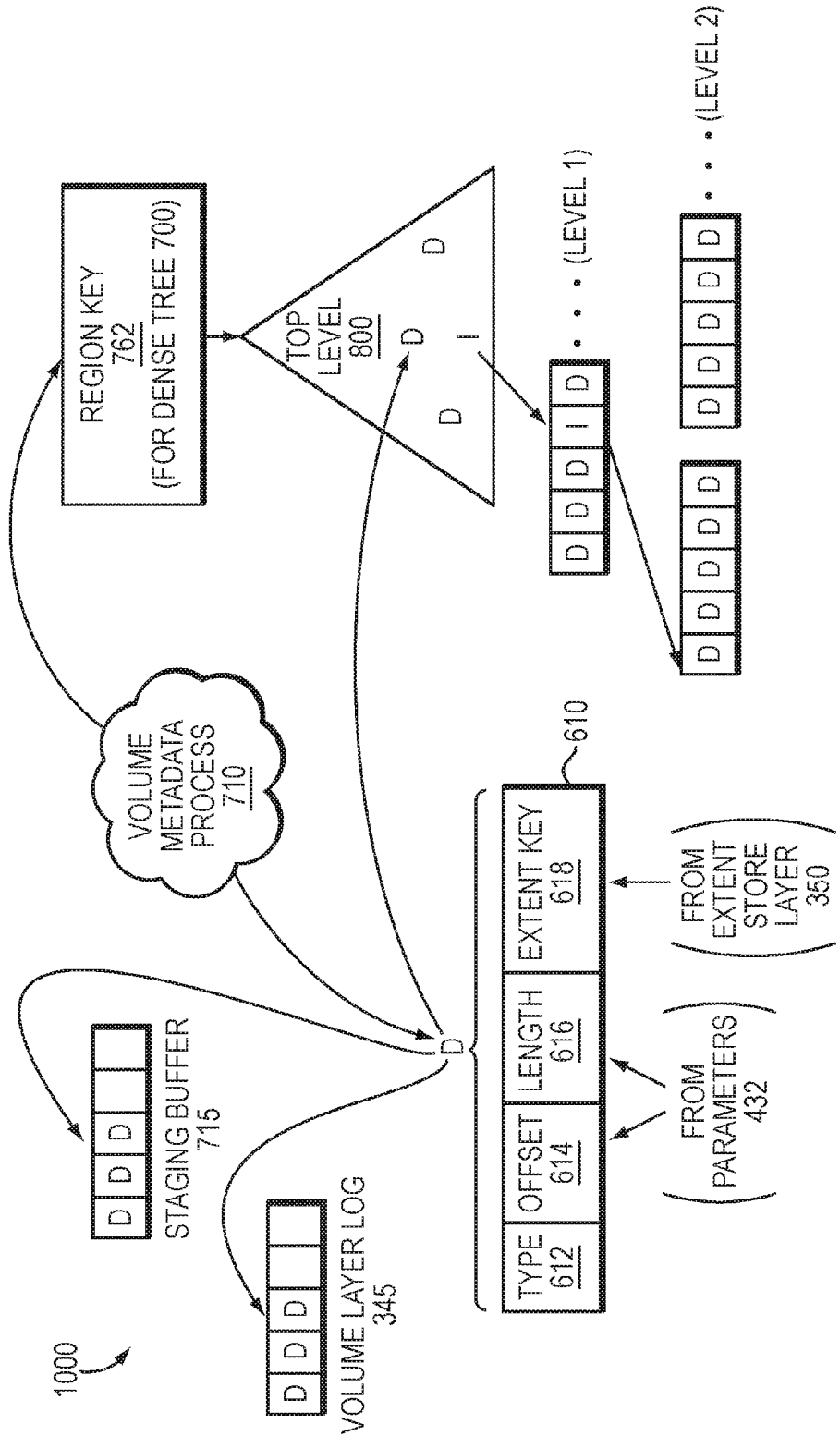
FIG. 10 illustrates a workflow for inserting a volume metadata entry into the dense tree metadata structure in accordance with a write request.

In one or more embodiments, operations for volume metadata managed by the volume layer 340 include insertion of volume metadata entries, such as data entries 610, into the dense tree 700 for write requests. As noted, each dense tree 700 may be embodied as multiple levels of a search structure with possibly overlapping offset range entries at each level, wherein each level is a packed array of entries (e.g., sorted by offset) and where leaf entries have an offset range (offset, length) an extent key. FIG. 10 illustrates a workflow 1000 for inserting a volume metadata entry into the dense tree metadata structure in accordance with a write request. In an embodiment, volume metadata updates (changes) to the dense tree 700 occur first at the top level of the tree, such that a complete, top-level description of the changes is maintained in memory 220.

Operationally, the volume metadata process 710 applies the region key 762 to access the dense tree 700 (i.e., top level 800) of an appropriate region (e.g., offset range 440 as determined from the parameters 432 derived from a write request 410). Upon completion of a write request, the volume metadata process 710 creates a volume metadata entry, e.g., a new data entry 610, to record a mapping of offset/length-to-extent key (i.e., offset range-to-user data). Illustratively, the new data entry 610 includes an extent key 618 (i.e., from the extent store layer 350) associated with data (i.e., extent 470) of the write request 410, as well as offset 614 and length 616 (i.e., from the write parameters 432) and type 612 (i.e., data entry D). The volume metadata process 710 then updates the volume metadata by inserting (adding) the data entry D into the level 0 staging buffer 715, as well as into the top level 800 of dense tree 700 and the volume layer log 345, thereby signifying that the write request is stored on the storage array 150.

Dense Tree Volume Metadata Checkpointing

When a level of the dense tree 700 is full, volume metadata entries 600 of the level are merged with the next lower level of the dense tree. As part of the merge, new index entries 620 are created in the level to point to new lower level metadata pages 720, i.e., data entries from the level are merged (and pushed) to the lower level so that they may be "replaced" with an index reference in the level. The top level 800 (i.e., level 0) of the dense tree 700 is illustratively maintained in-core such that a merge operation to level 1 facilitates a checkpoint to SSD 260. The lower levels (i.e., levels 1 and/or 2) of the dense tree are illustratively maintained on-flash and updated (e.g., merged) as a batch operation (i.e., processing the entries of one level with those of a lower level) when the higher levels are full. The merge operation illustratively includes a sort, e.g., a 2-way merge sort operation. A parameter of the dense tree 700 is the ratio K of the size of level N−1 to the size of level N. Illustratively, the size of the array at level N is K times larger than the size of the array at level N−1, i.e., sizeof(level N)=K*sizeof(level N−1). After K merges from level N−1, level N becomes full (i.e., all entries from a new, fully-populated level N−1 are merged with level N, iterated K times.)

Figure 11:
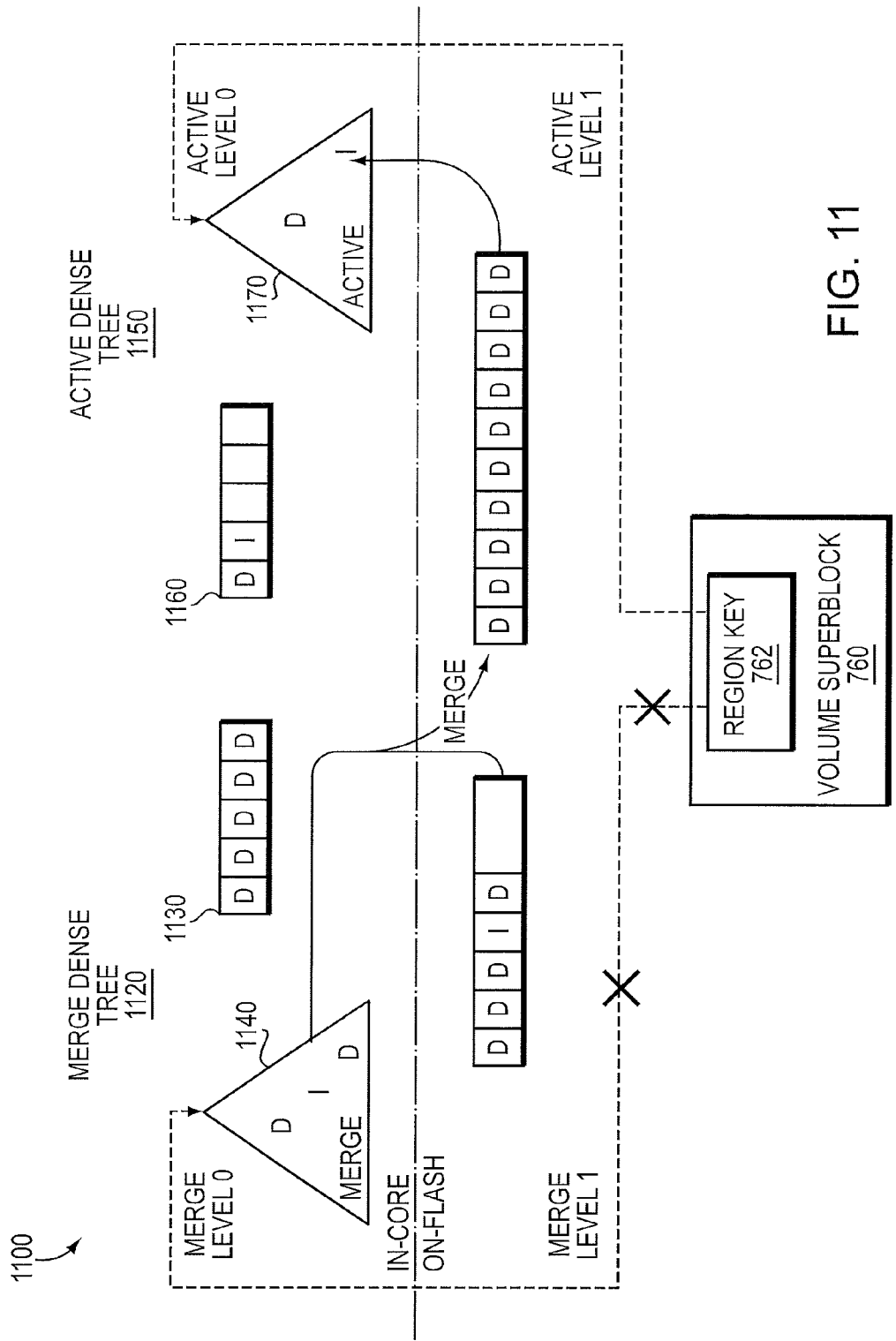
FIG. 11 illustrates merging between levels of the dense tree metadata structure.

FIG. 11 illustrates merging 1100 between levels, e.g., levels 0 and 1, of the dense tree metadata structure. In an embodiment, a merge operation is triggered when level 0 is full. When performing the merge operation, the dense tree metadata structure transitions to a "merge" dense tree structure (shown at 1120) that merges, while an alternate "active" dense tree structure (shown at 1150) is utilized to accept incoming data. Accordingly, two in-core level 0 staging buffers 1130, 1160 are illustratively maintained for concurrent merge and active (write) operations, respectively. In other words, an active staging buffer 1160 and active top level 1170 of active dense tree 1150 handle in-progress data flow (i.e., active user read and write requests), while a merge staging buffer 1130 and merge top level 1140 of merge dense tree 1120 handle consistency of the data during a merge operation. That is, a "double buffer" arrangement may be used to handle the merge of data (i.e., entries in the level 0 of the dense tree) while processing active operations.

During the merge operation, the merge staging buffer 1130, as well as the top level 1140 and lower level array (e.g., merge level 1) are read-only and are not modified. The active staging buffer 1160 is configured to accept the incoming (user) data, i.e., the volume metadata entries received from new put operations are loaded into the active staging buffer 1160 and added to the top level 1170 of the active dense tree 1150. Illustratively, merging from level 0 to level 1 within the merge dense tree 1120 results in creation of a new active level 1 for the active dense tree 1150, i.e., the resulting merged level 1 from the merge dense tree is inserted as a new level 1 into the active dense tree. A new index entry I is computed to reference the new active level 1 and the new index entry I is loaded into the active staging buffer 1160 (as well as in the active top level 1170). Upon completion of the merge, the region key 762 of volume superblock 760 is updated to reference (point to) the root, e.g., active top level 1170 and active level 0 header (not shown), of the active dense tree 1150, thereby deleting (i.e., rendering inactive) merge level 0 and merge level 1 of the merge dense tree 1120. The merge staging buffer 1130 (and the top level 1140 of the dense tree) thus becomes an empty inactive buffer until the next merge. The merge data structures (i.e., the merge dense tree 1120 including staging buffer 1130) may be maintained in-core and "swapped" as the active data structures at the next merge (i.e., "double buffered").

Figure 12:
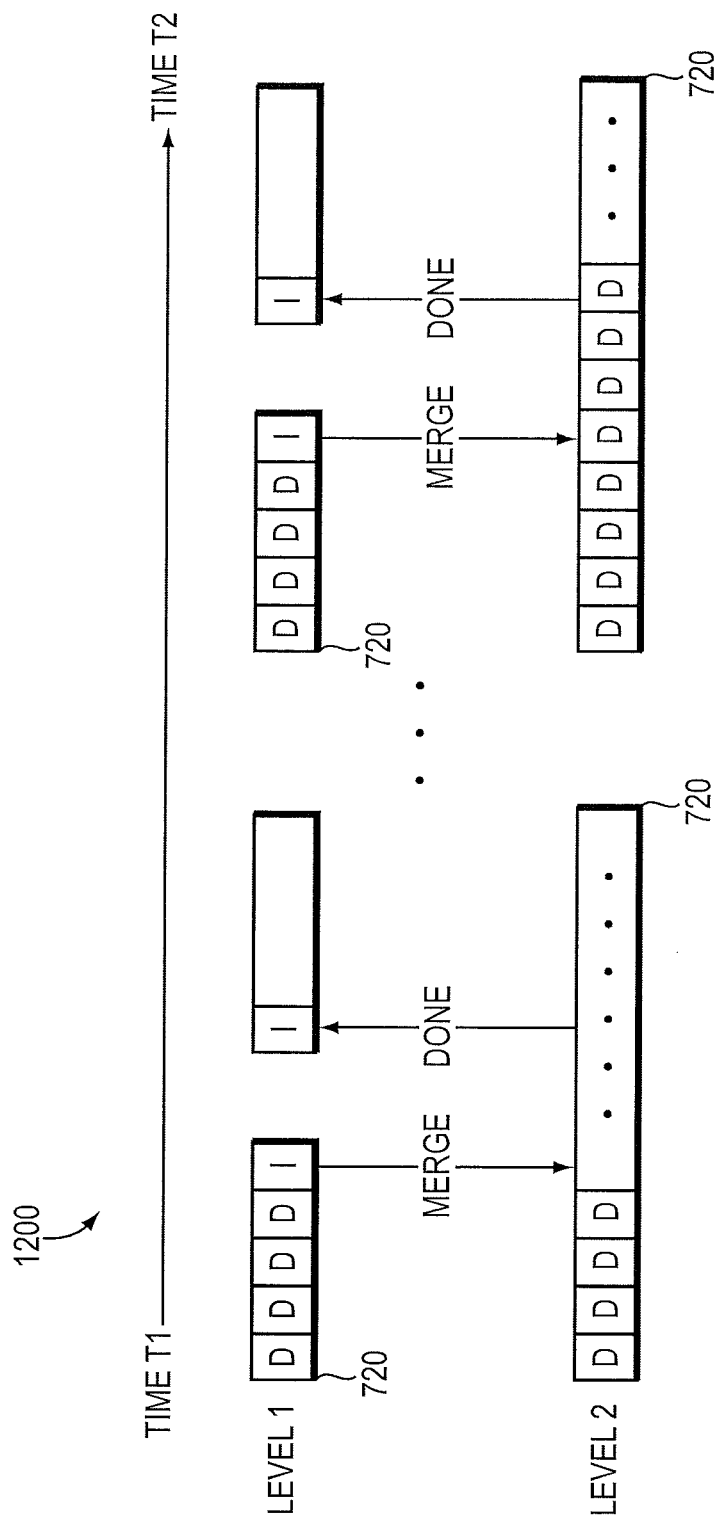
FIG. 12 illustrates batch updating between levels of the dense tree metadata structure.

FIG. 12 illustrates batch updating 1200 between lower levels, e.g., levels 1 and 2, of the dense tree metadata structure. Illustratively, as an example, a metadata page 720 of level 1 includes four data entries D and an index entry I referencing a metadata page 720 of level 2. When full, level 1 batch updates (merges) to level 2, thus emptying the data entries D of level 1, i.e., contiguous data entries are combined (merged) and pushed to the next lower level with a reference inserted in their place in the level. The merge of changes of layer 1 into layer 2 illustratively produces a new set of extents on SSD, i.e., new metadata pages are also stored, illustratively, in an extent store instance. As noted, level 2 is illustratively several times larger, e.g., K times larger, than level 1 so that it can support multiple merges. Each time a merge is performed, some older entries that were previously on SSD may be deleted. Advantageously, use of the multi-level tree structure lowers the overall frequency of volume metadata that is rewritten (and hence reduces write amplification), because old metadata may be maintained on a level while new metadata is accumulated in that level until it is full. Further, when a plurality of upper levels become full, a multi-way merge to a lower level may be performed (e.g., a three-way merge from full levels 0 and 1 to level 2).

Figure 13:
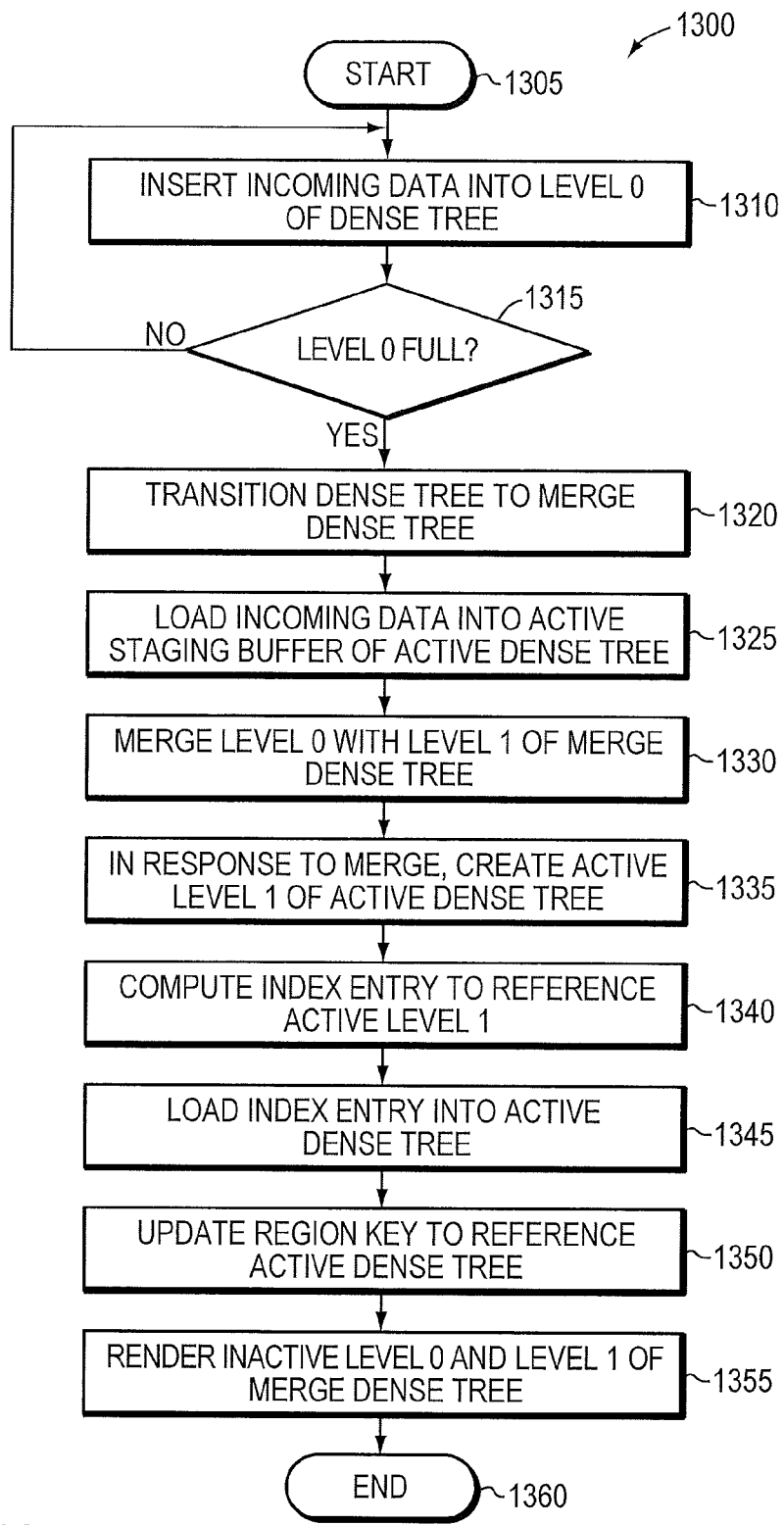
FIG. 13 is an example simplified procedure for merging between levels of the dense tree metadata structure.

FIG. 13 is an example simplified procedure 1300 for merging between levels of the dense tree metadata structure. The procedure starts at step 1305 and proceeds to step 1310 where incoming data received at the dense tree metadata structure is inserted into level 0, i.e., top level 800, of the dense tree. Note that the incoming data is inserted into the top level 800 as a volume metadata entry. At step 1315, a determination is made as whether level 0, i.e., top level 800, of the dense tree is rendered full. If not, the procedure returns to step 1310; otherwise, if the level 0 is full, the dense tree transitions to a merge dense tree structure at step 1320. At step 1325, incoming data is loaded into an active staging buffer of an active dense tree structure and, at step 1330, the level 0 merges with level 1 of the merge dense tree structure. In response to the merge, a new active level 1 is created for the active dense tree structure at step 1335. At step 1340, an index entry is computed to reference the new active level 1 and, at step 1345, the index entry is loaded into the active dense tree structure. At step 1350, a region key of a volume superblock is updated to reference the active dense tree structure and, at step 1355, the level 0 and level 1 of the merge dense tree structure are rendered inactive (alternatively, deleted). The procedure then ends at step 1360.

In an embodiment, as the dense tree fills up, the volume metadata is written out to one or more files on SSD in a sequential format, independent of when the volume layer log 345 is de-staged and written to SSD 260, i.e., logging operations may be independent of merge operations. When writing volume metadata from memory 220 to SSD, direct pointers to the data, e.g., in-core references to memory locations, may be replaced with pointers to an index block in the file that references a location where the metadata can be found. As the files are accumulated, they are illustratively merged together in a log-structured manner that continually writes the metadata sequentially to SSD. As a result, the lower level files grow and contain volume metadata that may be outdated because updates have occurred to the metadata, e.g., newer entries in the dense tree may overlay older entries, such as a hole entry overlaying an underlying data entry. The updates (i.e., layered LBA ranges) are "folded"

into the lower levels, thereby overwriting the outdated metadata. The resulting dense tree structure thus includes newly written metadata and "holes" where outdated metadata has been deleted.

Dense Tree Volume Metadata Logging

In an embodiment, the volume layer log 345 is a two level, append-only logging structure, wherein the first level is NVRAM 280 (embodied as NVLogs 285) and the second level is SSD 260, e.g., stored as extents. New volume metadata entries 600 inserted into level 0 of the dense tree are also recorded in the volume layer log 345 of NVLogs 285. When there are sufficient entries in the volume layer log 345, e.g., when the log 345 is full or exceeds a threshold, the volume metadata entries are flushed (written) from log 345 to SSD 260 as one or more extents 470. Multiple extents may be linked together with the volume superblock 760 holding a key (i.e., an extent key) to the head of the list. In the case of recovery, the volume layer log 345 is read back to memory 220 to reconstruct the in-core top level 800 (i.e., level 0) of dense tree 700. Other levels may be demand paged via the page cache 448, e.g., metadata pages of level 1 are loaded and read as needed.

Figure 14:
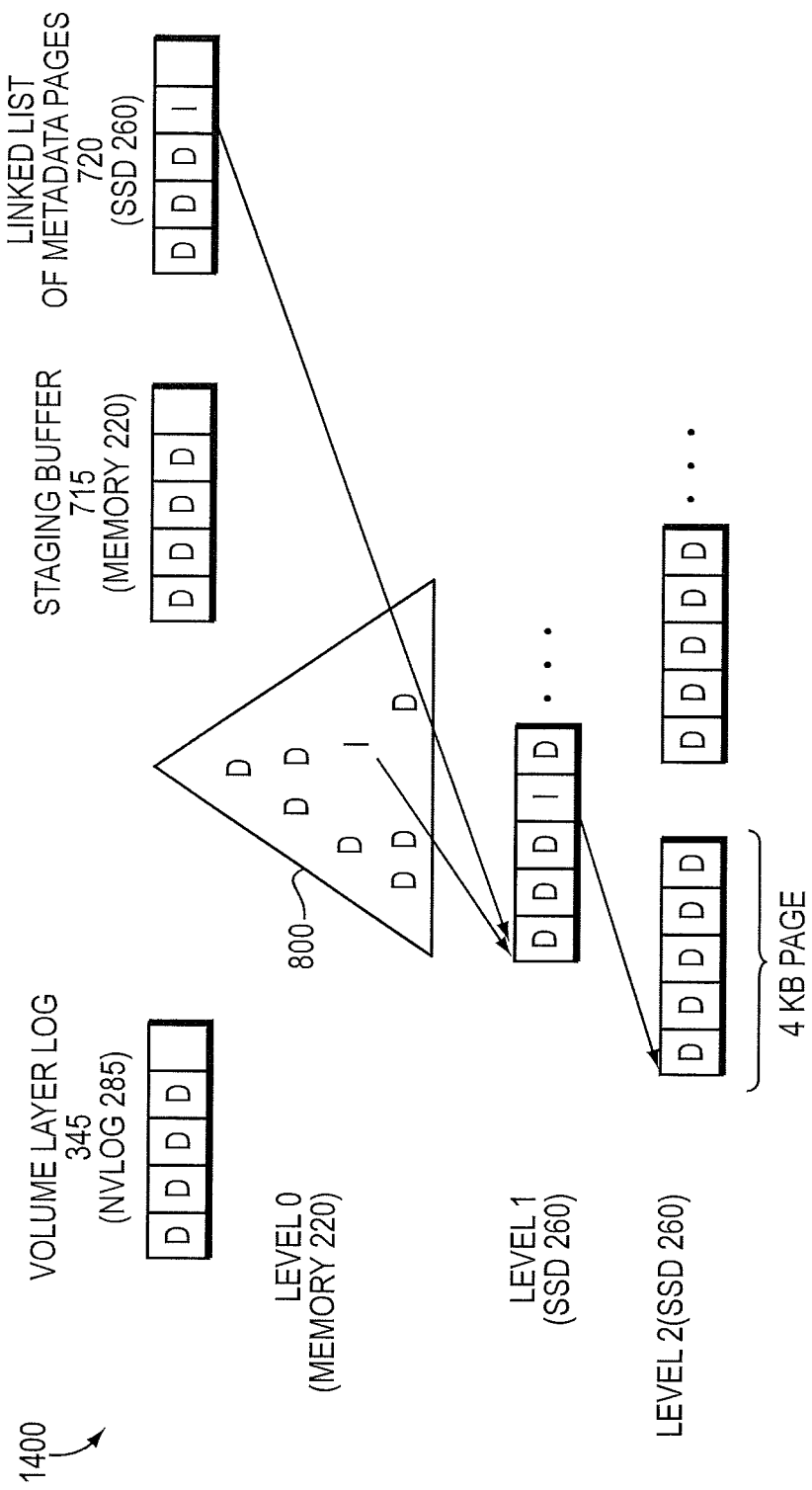
FIG. 14 illustrates volume logging of the dense tree metadata structure.

FIG. 14 illustrates volume logging 1400 of the dense tree metadata structure. Copies of the volume metadata entries 600 stored in level 0 of the dense tree are maintained in persistent storage (SSD 260) and recorded as volume layer log 345 in, e.g., NVLogs 285. Specifically, the entries of level 0 are stored in the in-core staging buffer 715, logged in the append log (volume layer log 345) of NVLogs 285 and thereafter flushed to SSD 260 as a linked list of metadata pages 720. Copies of the level 0 volume metadata are maintained in-core as the active dense tree level 0 so as to service incoming read requests from memory 220. Illustratively, the in-core top level 800 (e.g., active dense tree level 0 1170) may be used as a cache (for hot metadata), whereas the volume metadata stored on the other lower levels of the dense tree are accessed less frequently (cold data) and maintained on SSD. Alternatively, the lower levels also may be cached using the page cache 448.

Recovering Trapped Logical Storage Space

Embodiments described herein are directed to a technique for recovering storage space trapped in an extent store due to overlapping write requests associated with volume metadata managed by the volume layer. As noted, the volume metadata is illustratively organized as a multi-level dense tree metadata structure, wherein each level of the dense tree metadata structure (dense tree) includes volume metadata entries for storing the volume metadata. When a level of the dense tree is full (e.g., exceeds a threshold), the volume metadata entries of the level are merged with a next lower level of the dense tree in accordance with a dense tree merge operation. Illustratively, the technique may be invoked during the merge operation to process the volume metadata entries at each level of the dense tree involved in the merge and determine the offset range overlap of the entries. Processing of the overlapping write requests during the merge operation may manifest as partial overwrites of one or more existing extents which, in turn, may result in logical storage space being trapped in the extent store. As used herein, the extent store may be viewed as a global pool of extents stored on the storage arrays of the cluster.

A dense tree merge operation generally triggers freeing of trapped space, i.e., the technique for recovering trapped storage space is initiated during a merge operation. For example, assume a host issues a first set of write requests to write data to a first portion of a LUN without issuing (i.e., halting) further write requests, such that the first set of write requests is insufficient to fill a level of the dense tree associated with the first portion (i.e., first region) of the LUN. Any space trapped by the LUN will remain because there is no further write requests to trigger a merge and, thus, no merge to trigger the freeing of the trapped space. Assume the host then issues a second set of write requests to write data to a second different portion (i.e., second region) of the LUN (associated with a dense tree different from that of the first region of the LUN). It is possible that the trapped space resulting from the first set of write requests may cause the storage array to run out of available storage space at some point as each region of the LUN may be associated with a distinct dense tree that may result in trapped space. In other words, the halting of write requests directed to a portion of the LUN may prevent filling of the dense tree associated with that portion of the LUN, thereby causing trapped space due to failure to trigger freeing of that trapped space. Accordingly, (proactive) trapped space recovery may be required in accordance with the technique described herein.

In an embodiment, the technique may leverage an algorithm employed to calculate an amount of the trapped storage space of the existing extents. An exemplary embodiment of an algorithm used to calculate trapped storage space is disclosed and described in U.S. patent application Ser. No. 14/482,863, titled Technique for Quantifying Logical Space Trapped in an Extent Store, by Babu et al., filed on Sep. 10, 2014. The technique may then perform read-modify-write (RMW) operations on the partially overwritten extents to recapture that trapped space by, e.g., purging (dereferencing) the existing extents consuming the trapped storage space and writing new extents having non-overlapped data, thus freeing the overlapped portion from the storage space. Accordingly, the active dense tree may include entries from the previous merge as well as new write data. Illustratively, the storage space trapped (locked up) by the partially overwritten extents may be recovered (freed) by reading and re-writing one or more valid data portions of each extent having locked up storage space through the use of "out-of-band" (i.e., independent of the merge) processing of the RMW operations. It is desirable to perform modifications to the partially overwritten extents as out-of-band processing to avoid volume layer logging (i.e., NVlogging) overhead during the merge operation.

Figure 15:
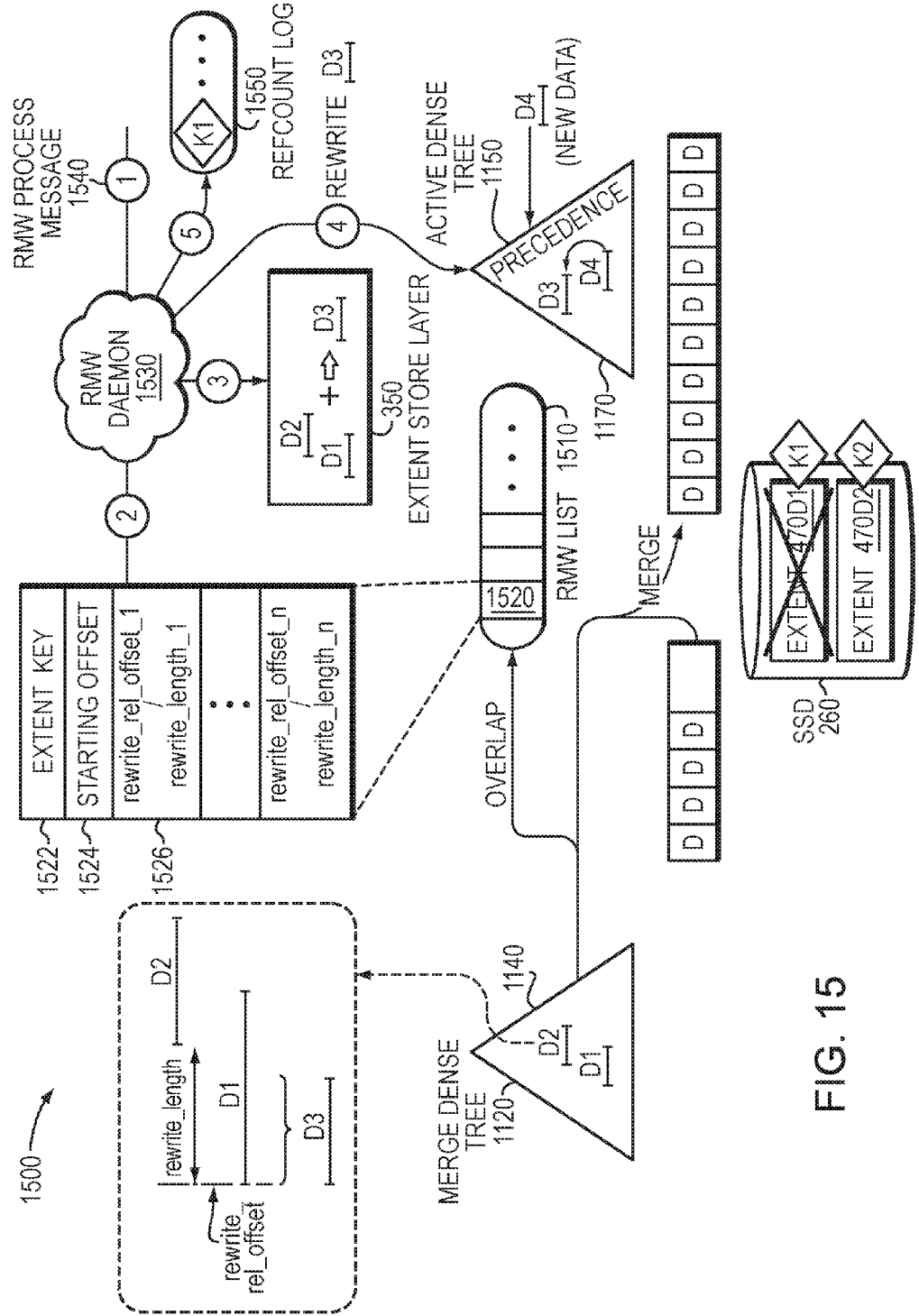
FIG. 15 illustrates a technique for recovering trapped storage space.

FIG. 15 is illustrates the technique 1500 for recovering trapped storage space. During the dense tree merge operation, trapped space is calculated and any overlapping dense tree entries (referencing existing, partially overwritten extents) are identified and inserted onto a RMW list 1510. The RMW list 1510 is an on-disk data structure illustratively embodied as a multi-level indexing table that contains an intention to perform RMW operations on the identified existing extents. The non-overlapped portions, i.e., valid (non-overlapped) host accessible portions, of dense tree entries that trap space are organized as one or more elements 1520 of the RMW list, wherein each element 1520 includes an extent key 1522 associated with an existing extent and a set of (offset, length) pairs 1526, and wherein each pair points to a "still valid" (non-overlapped) data portion of the extent. After the merge completes, a RMW daemon 1530 of the volume layer 340 may traverse the RMW list 1510, processing each element (numeral "2"). Processing of an element 1520 in the RMW list involves reading of the extent key 1522 and re-writing of the valid portion(s) of the extent (e.g., D1) in accordance with a RMW operation (numeral "3"). As a result of the RMW operation, the existing (partially overlapped) extent D1 is effectively re-written as one or more new extents D3 with valid data and the existing extent D1 is purged (dereferenced) by inserting its associated extent key K1 into a reference count log 1550 (numeral "5") during a next dense tree merge operation.

In an embodiment, the reference count (refcount) log 1550 may be used to allow the merge operation to complete while deferring deletion (i.e., reference count reduction) of extent keys associated with extents having trapped space to thereby free storage space of those extents. For example, one or more requests to overwrite an offset range within a LUN may be captured, e.g., as extent keys associated with the trapped-space extents during the dense tree merge operation and, once the operation completes, the keys may be inserted into the refcount log. Subsequently, a deferred reference count update process may delete each key, e.g., from the extent store layer 350, independently from the merge operation, thus freeing the storage space associated with the trapped-space extents in an out-of-band fashion. An exemplary embodiment of a refcount log used to efficiently free storage space for metadata associated with data to be deleted during a merge operation is disclosed and described in U.S. patent application Ser. No. 14/484,061, titled Deferred Reference Count Update Technique for Low Overhead Volume Metadata, by Pundir et al., filed on Sep. 11, 2014.

As previously described herein, a double buffer arrangement may be employed during the dense tree merge operation, where the merge dense tree 1120 handles consistency processing of the merge operation, while the active dense tree 1150 handles processing of new write requests received at the volume layer. Any overlapping dense tree entries D1, D2 resulting from the trapped space calculation are rewritten upon detection during the dense tree merge operation. In an embodiment, the overlapping entries may be inserted onto the RMW list 1510 prior to insertion into the active dense tree 1150 of the volume, so as to make use of the write path 400. The overlapping entries identify extents to be rewritten and as many overlapping entries are processed as possible before the next merge operation. Illustratively, such processing includes sorting the elements 1520 on the RMW list 1510 by extent key 1522 to avoid reading the same key multiple times.

In an embodiment, processing of the overlapping dense tree entries by the RWM daemon 1530 also includes tagging each write entry with a special re-write bit (e.g., a flag) when inserted into the active dense tree (numeral "4"), wherein the re-write bit denotes processing of the overlapping entry D3 with lower precedence, because each re-write flagged entry (rewrite entry) derives from a previous merge and, thus, is earlier than any entry in the active (current) dense tree. That is, the flag is tagged to an overlapping entry D3 to ensure that newer data associated with write requests received at the volume layer 340 from the persistence layer 330 is given precedence over the overlapping rewrite entry. Effectively, the overlapping rewrite entry may be itself overlapped with a newer entry D4 associated with the newer data. As such, the newer entry D4 is processed at higher precedence. For example, assume a rewrite operation is performed on an existing extent associated with an overlapping entry that collides with an entry in L0 (B tree) of the active dense tree 1150. The dense tree entry in active L0 references a newer extent data portion than that of the older overlapping metadata entry associated with the older rewrite data portion of the existing extent. Accordingly, in response to the collision, the older rewrite data of the existing extent may be discarded in lieu of the newer data to obviate rewriting of the overlapping older data, thereby freeing the trapped space. That is, a rewrite entry (i.e., an as yet unprocessed entry of the RMW list inserted into the active dense tree) that collides with the newer entry may be discarded.

Operationally, the RMW daemon 1530 organizes the overlapping dense tree entries identified from the trapped space calculation as elements 1520 of the RMW list 1510 during a dense tree merge operation. To avoid collisions as described above, it is desirable to perform recovery (freeing) of trapped space during a dense tree merge operation of sufficient duration so that the RMW list is entirely processed. As such, RMW list may be processed during a 3-way merge, wherein L0, L1, and L2 of the merge dense tree are merged into a new L2 as new write requests are loaded into L0 of the active dense tree. Multi-level dense tree merge operations are disclosed and described in U.S. patent application Ser. No. 14/546,214, titled N-Way Merge Technique for Updating Volume Metadata in a Storage I/O Stack, by D'Sa et al., filed on Nov. 18, 2014. The RMW list 1510 is illustratively maintained in-core although, in an embodiment, the list may be persisted on disk (flash) so as to identify entries (i.e., elements of the RMW list) that require processing in the event of a system crash.

In an embodiment, each element 1520 of the RMW list 1510 illustratively includes: an extent key 1522, a starting_offset 1524, and a set of pairs 1526 of re-write relative offsets and lengths denoting valid portions of the extent to be modified, e.g., a <rewrite_rel_offset_1, rewrite_length_1>, . . . <rewrite_rel_offset_n, rewrite_length_n>, wherein the extent key 1522 is the extent store key identifying the extent to be modified, the starting_offset 1524 is the starting host LBA offset of the write operation to the extent, each of the <rewrite_rel_offset_n, rewrite_length_n> pairs 1526 indicates the valid portion of the extent (to be re-written), and the rewrite_rel_offset_n is a relative offset from a start of the extent.

The RMW daemon 1530 may sort the RMW list 1510 by extent key 1522 to identify any duplicate keys (to avoid rereading the duplicates). The RMW daemon may then insert the elements 1520 of the RMW list into the active dense tree 1150 as rewrite requests. Each rewrite request is tagged with the rewrite bit and stored on the staging buffer 1160 of the active dense tree as well as on the append log (volume layer log 345) for persistent storage as an EOS NVlog entry, e.g., for crash recovery. Note that the rewrite data may be loaded into the append log before being resolved in-core at L0 and then discarded. When the system recovers, L0 may be recreated in a manner that avoids losing new data. Illustratively, when rebuilding L0 upon crash recovery, the contents of the append log may be read such that the presence of the rewrite bit allows discarding of older data that overlaps with newer data in the log. The rewrite bit (flag) associated with the RMW operation is maintained to identify the rewrite request as being older than newer write requests from the persistence layer that may overlap with the range of the overwrite.

The RMW daemon 1530 may then determine whether the overlapping older data of the rewrite request collides with newer data of write requests received at active L0 and, if so, discards the rewrite request (and older data). The RMW daemon may process each remaining rewrite request by reading the extent key and re-writing the valid data portion(s) of the extent. Specifically, the RMW daemon 1530 may perform a read operation of the (older) extent corresponding to the (older) extent key from the extent store layer 350 (via a get operation) and perform a write operation with (LBA) offset (starting_offset+rewrite_rel_offset_1) and length rewrite_length_1. The data to be written is of a range starting at rewrite_rel_offset_1 in the existing (older) extent and rewrite_length_1 in length. As a result of the re-write processing, a new extent is created and associated with a new extent key (via extent hashing), while the older extent is effectively "overwritten" (i.e., no longer accessible by the host) and discarded (purged) by, e.g., moving the associated extent key (e.g., "K1" associated with extent 470D1) to the refcount log 1550 to be dereferenced. Note that the older extent is discarded with respect to the LUN instance and may, nevertheless, remain host accessible in a snapshot or clone. The new extent and new extent key are then passed over the write path 400 to the extent store layer (via a put operation) as previously described herein. A RMW processor (as executed by the storage I/O stack service in response to a RMW process message 1540) may process the rewrite requests in a best efforts manner to perform the operations before the next dense tree merge operation. Otherwise, the remaining rewrite requests are discarded and the trapped space calculation is performed again, leading to creation of another RMW list during the next merge operation.

In an embodiment, the RMW processor message 1540 is received by the RMW daemon 1530 (numeral "1") and used to initiate processing of the elements 1520 from the RMW list 1510 in order to trigger and pace the processing of the list. Progress of the RMW processor message 1540 for each element (including pacing of associated read and write requests) is illustratively tracked in an NVLog entry. Since the volume layer 340 handles metadata processing, the RMW processor message 1540 may be used to communicate with the extent store layer 350 to enable rewriting of the extent data. Illustratively, the extent store layer facilitates access to the new overlapping data to create a truncated buffer that contains the portion of overlapping data used to complete the rewrite (RMW) operation. As a result of the RMW operation, the old extent is effectively overwritten as one or more new extents with valid data and its associated key is moved to the refcount log 1550 for handling as a deferred delete, i.e., the old extent is purged (dereferenced). Notably, a volume (write code) process may be employed to dereference the older extent, while an extent store layer process may be used for garbage collecting and modifying the appropriate hash table entry to render a reference count for the older extent to zero.

While there have been shown and described illustrative embodiments directed to a technique for recovering storage space trapped in then extent store due to overlapping write requests associated with metadata managed by the volume layer of the storage I/O stack, it is to be understood that various other adaptations and modifications may be made within the spirit and scope of the embodiments herein. For example, embodiments have been shown and described herein with relation to performing recovery of trapped storage space during a 3-way merge operation. However, the embodiments in their broader sense are not so limited, and may, in fact, also recovery of trapped space for any type of merge operations, e.g., L0 to L1, L1 to L2, or a 3-way merge. As noted, it is desirable to perform recovery of trapped space during the 3-way merge in order to provide sufficient time to process all the overlapping entries before the next dense tree merge. A L0-L1 merge operation does not generally provide enough time to process all the entries and rewrite all partially overwritten extents so as to make progress. Yet, smaller volumes may not fill up enough to occupy L2, so space locked up in L1 may go unaddressed. Accordingly, recovery of trapped space may also occur during either a L0-L1 merge or the 3-way merge.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software encoded on a tangible (non-transitory) computer-readable medium (e.g., disks, electronic memory, and/or CDs) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
receiving first and second write requests directed towards a logical unit (LUN), the first and second write requests having respective first and second data, the first and second write requests representing respective first and second offset ranges of the LUN, the second offset range overlapping a portion of the first offset range, the write requests processed at a storage system having a memory;
computing first and second keys from the respective first and second data;
storing the first and second keys in respective first and second data entries of a metadata structure, the first data entry representing the first offset range of the LUN, the second data entry representing the second offset range of the LUN;
storing, in a storage array attached to the storage system, the first and second data as first and second extents respectively;
storing a valid portion of the first extent as a third extent in the storage array; and
purging the first extent and retaining the second extent such that the second extent is accessible via a read request directed towards the LUN after purging the first extent.

2. The method of claim 1 further comprising:
merging the first and second data entries to form a third data entry of the metadata structure, the third data entry storing a third key associated with the third extent.

3. The method of claim 2 further comprising:
performing a read-modify-write operation on the first extent to generate the third extent.

4. The method of claim 3 wherein the read-modify-write operation is performed out-of-band with the merge of the first and second data entries.

5. The method of claim 2 wherein the merging of the first and second data entries further comprises:
inserting an element into a read-modify-write list, the element representing the valid portion of the first extent and including the first key.

6. The method of claim 5 wherein the element further includes a relative offset from a beginning of the first extent denoting the valid portion of the first extent and a length of the valid portion of the first extent.

7. The method of claim 5 further comprising:
inserting the third data entry into the metadata structure such that the third data entry has lower precedence than a fourth data entry inserted into the metadata structure before the third data entry is inserted into the metadata structure.

8. The method of claim 7 further comprising:
in response to determining that the third data entry collides with the fourth data entry, discarding the third data entry.

9. The method of claim 1 wherein purging the first extent further comprises:
dereferencing the first key with the first extent.

10. The method of claim 1 further comprising:
performing a deferred reference count update of the first key.

11. A system comprising:
a storage system having a memory connected to a processor via a bus;
a storage array coupled to the storage system; and
a storage I/O stack executing on the processor of the storage system, the storage I/O stack configured to:
receive first and second write requests directed towards a logical unit (LUN), the first and second write requests having respective first and second data, the first and second write requests representing respective first and second offset ranges of the LUN, the second offset range overlapping a portion of the first offset range;
compute first and second keys from the respective first and second data;
store the first and second keys in respective first and second data entries of a metadata structure, the first data entry representing the first offset range of the LUN, the second data entry representing the second offset range of the LUN;
store, in the storage array, the first and second data as first and second extents respectively;
store a valid portion of the first extent as a third extent in the storage array; and
purge the first extent and retain the second extent such that the second extent is accessible via a read request directed towards the LUN after purging the first extent.

12. The system of claim 11 wherein the storage I/O stack is further configured to:
merge the first and second data entries to form a third data entry of the metadata structure, the third data entry storing a third key associated with the third extent.

13. The system of claim 12 wherein the storage I/O stack is further configured to:
perform a read-modify-write operation on the first extent to generate the third extent.

14. The system of claim 13 wherein the read-modify-write operation is performed out-of-band with the merge of the first and second data entries.

15. The system of claim 11 wherein the storage I/O stack configured to merge the first and second data entries is further configured to:
insert an element into a read-modify-write list, the element representing the valid portion of the first extent and including the first key.

16. The system of claim 15 wherein the element further includes a relative offset from a beginning of the first extent denoting the valid portion of the first extent and a length of the valid portion of the first extent.

17. The system of claim 11 wherein the storage I/O stack is further configured to:
insert the third data entry into the metadata structure such that the third data entry has lower precedence than a fourth data entry inserted into the metadata structure before the third data entry.

18. The system of claim 11 wherein the storage I/O stack configured to purge the first extent is further configured to:
dereference the first key with the first extent.

19. The system of claim 11 wherein the storage I/O stack is further configured to:
perform a deferred reference count update of the first key.

20. A non-transitory computer readable media containing instructions for executing on a central processing unit (CPU) of a storage system having a memory for a method comprising:
receiving first and second write requests directed towards a logical unit (LUN), the first and second write requests having respective first and second data, the first and second write requests representing respective first and second offset ranges of the LUN, the second offset range overlapping a portion of the first offset range;
computing first and second keys from the respective first and second data;
storing the first and second keys in respective first and second data entries of a metadata structure, the first data entry representing the first offset range of the LUN, the second data entry representing the second offset range of the LUN;
storing in a storage array attached to the storage system, the first and second data as first and second extents respectively;
storing a valid portion of the first extent as a third extent in the storage array; and
purging the first extent and retaining the second extent such that the second extent is accessible via a read request directed towards the LUN after purging the first extent.

* * * * *